US011983210B2

(12) United States Patent
Fox et al.

(10) Patent No.: US 11,983,210 B2
(45) Date of Patent: May 14, 2024

(54) METHODS AND SYSTEMS FOR GENERATING SUMMARIES GIVEN DOCUMENTS WITH QUESTIONS AND ANSWERS

(71) Applicant: VIRGINIA TECH INTELLECTUAL PROPERTIES, INC., Blacksburg, VA (US)

(72) Inventors: Edward A. Fox, Blacksburg, VA (US); Saurabh Chakravarty, Christiansburg, VA (US); Satvik Chekuri, Blacksburg, VA (US); Maanav Mehrotra, Blacksburg, VA (US); Aarohi Sumant, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 250 days.

(21) Appl. No.: 17/343,560

(22) Filed: Jun. 9, 2021

(65) Prior Publication Data
US 2021/0390127 A1    Dec. 16, 2021

Related U.S. Application Data

(60) Provisional application No. 63/039,725, filed on Jun. 16, 2020.

(51) Int. Cl.
*G06F 16/34*    (2019.01)
*G06F 16/35*    (2019.01)
(Continued)

(52) U.S. Cl.
CPC ........... *G06F 16/345* (2019.01); *G06F 16/35* (2019.01); *G06F 40/216* (2020.01); *G06F 40/35* (2020.01); *G06N 3/08* (2013.01)

(58) Field of Classification Search
CPC ........ G06F 16/345; G06F 16/35; G06F 40/35; G06F 40/216; G06N 3/08
See application file for complete search history.

(56) References Cited

U.S. PATENT DOCUMENTS 7,376,893 B2 *  5/2008  Chen ................. G06F 16/345
                                                  715/255
9,977,829 B2 *  5/2018  Simske ............. G06F 16/3326
(Continued)

OTHER PUBLICATIONS

McKeown, Kathleen, Lokesh Shrestha, and Owen Rambow, "Using Question-Answer Pairs in Extractive Summarization of Email Conversations", Feb. 2007, Computational Linguistics and Intelligent Text Processing: 8th International Conference (CICLing 2007), LNCS 4394, pp. 542-550. (Year: 2007).*

(Continued)

*Primary Examiner* — Richa Sonifrank
*Assistant Examiner* — James Boggs
(74) *Attorney, Agent, or Firm* — Thomas Horstemeyer, LLP

(57) ABSTRACT

Described herein are systems and methods to enable generation of high-quality summaries of documents that have questions and answers. To help summarize such documents, parsing methods are disclosed that account for different document formats. Question-answer groups are transformed into declarative sentences. Sentence correction can be applied to the declarative sentences. Candidate summary sentences are identified from the declarative sentences, and a subset of the candidate summary sentences are selected for inclusion in a summary. Aspects, segmentation, and augmentation can help with generation and tailoring of summaries.

20 Claims, 17 Drawing Sheets

(51) Int. Cl.
  *G06F 40/216* (2020.01)
  *G06F 40/35* (2020.01)
  *G06N 3/08* (2023.01)

(56) References Cited

U.S. PATENT DOCUMENTS 10,275,515 B2 * 4/2019 Cai ..................... G06F 16/3344
11,494,564 B2 * 11/2022 Elsahar .................. G06N 3/045

OTHER PUBLICATIONS

Chakravarty, Saurabh, Raja Venkata Satya Phanindra Chava, and Edward A. Fox, "Dialog Acts Classification for Question-Answer Corpora", Jun. 21, 2019, Proceedings of the Third Workshop on Automated Semantic Analysis of Information in Legal Text (ASAIL 2019). (Year: 2019).*
Chakravarty, Saurabh, Maanav Mehrotra, Raja Venkata Satya Phanindra Chava, Han Liu, Matthew Krivansky, and Edward A. Fox, "Improving the Processing of Question Answer Based Legal Documents", Dec. 2019, Legal Knowledge and Information Systems, JURIX 2019, pp. 13-22. (Year: 2019).*
Wang, Tong, Ping Chen, John Rochford, and Jipeng Qiang, "Text Simplification Using Neural Machine Translation", 2016, Proceedings of the AAAI Conference on Artificial Intelligence (AAAI-16), vol. 30, No. 1, pp. 4270-4271. (Year: 2016).*
Prabhumoye, Shrimai, Yulia Tsvetkov, Ruslan Salakhutdinov, and Alan W. Black, "Style Transfer Through Back-Translation", May 2018, arXiv preprint arXiv:1804.09000. (Year: 2018).*
Bryant, Christopher, and Ted Briscoe, "Language Model Based Grammatical Error Correction without Annotated Training Data", Jun. 2018, Proceedings of the Thirteenth Workshop on Innovative Use of NLP for Building Educational Applications, pp. 247-253. (Year: 2018).*
Lin, Ziheng, Tat-Seng Chua, Min-Yen Kan, Wee Sun Lee, Long Qiu, and Shiren Ye, "NUS at DUC 2007: Using Evolutionary Models of Text", 2007, Proceedings of Document Understanding Conference (DUC 2007). (Year: 2007).*
Bahdanau et al. "Neural machine translation by jointly learning to align and translate"; In Proceedings of International Conference on Learning Representations (ICLR) (2014).
Bothe et al. "A context-based approach for dialogue act recognition using simple recurrent neural networks"; In Proceedings of the Eleventh International Conference on Language Resources and Evaluation (LREC-2018) (2018).
Chakravarty et al. "Dialog acts classification for question-answer corpora"; In Proceedings of the Third Workshop on Automated Semantic Analysis of Information in Legal Text (ASAIL 2019), Jun. 21, 2019, Montreal, QC, Canada (2019).
Cho et al. "On the properties of neural machine translation: Encoder-decoder approaches"; In Proceedings of SSST-8, Eighth Workshop on Syntax, Semantics and Structure in Statistical Transla- tion (2014), pp. 103-111.
Devlin et al. "BERT:pre-training of deep bidirectional transformers for language understanding"; In Proceedings of the 2019 Conference of the North American Chapter of the Association for Computational Linguistics: Human Language Technologies, NAACL-HLT 2019, Minneapolis, MN, USA, Jun. 2-7, 2019, vol. 1 (Long and Short Papers) (2019), J. Burstein, C. Doran, and T. Solorio, Eds., Association for Computational Linguistics, pp. 4171-4186.
Fernandez et al. "Dialog act classification from prosodic features using support vector machines"; In Speech Prosody 2002, International Conference (2002).
Goldberg "Neural network methods for natural language processing"; Synthesis Lectures on Human Language Technologies 10, 1 (2017), 1-309.
Hochreiter et al. "Long short-term memory"; Neural computation 9, 8 (1997), 1735-1780.
Jurafsky et al. "Lexical, prosodic, and syntactic cues for dialog acts"; Journal on Discourse Relations and Discourse Markers (1998).
Kim "Convolutional neural networks for sentence classification"; In Proceedings of the 2014 Conference on Empirical Methods in Natural Language Processing (EMNLP) (2014), ACL, pp. 1746-1751.
Chakravarty et al. "Improving the processing of question answer based legal documents"; In Proceedings of the JURIX 2019 Conference: Legal Knowledge and Information Systems (2019).
Srivastava et al. "Dropout: a simple way to prevent neural networks from overfitting"; The Journal of Machine Learning Research 15, 1 (2014), 1929-1958.
Kim, Y. "Convolutional neural networks for sentence classification". In Proceedings of the 2014 Conference on Empirical Methods in Natural Language Processing (EMNLP) (2014), ACL, pp. 1746-1751.

* cited by examiner

203

Page 53

```
 1         Q.  Is there smoking allowed in that office?
 2         A.  Yes, there is.
 3         Q.  And do people smoke around you in that
 4   office?
 5         A.  On occasion, yes, they do.
 6         Q.  And that smoking doesn't bother you?
 7         A.  No.
 8         Q.  What do you think about states like
 9   California that have banned smoking in all public
10   places including restaurants and bars?
11             MR. ROWLEY:  Object to the form.
12         A.  What do I think?
13         Q.  Personal reaction to that.
14         A.  I think that's kind of extreme.
15         Q.  Why?
16         A.  I think that -- I think people ought to
17   have that as an option.  I think business owners
18   ought to have that as an option, and I think people
19   ought to have an option as to what businesses they
20   want to patronize and what they don't.
21         Q.  What about for the non smoker, if you walk
22   into a public place and you have a person smoking,
23   the non smoker would not have an option then of not
24   smelling smoke in that particular room.
25             MR. ROWLEY:  Let's get a question.  That's
```

MIDWEST LITIGATION SERVICES

```
{
  deposition : [
    {
      "examiner" : EXAMINER1,
      "examination" : [
        {
          "question" : question text
          "answer" : answer text
        },
        {
          "question" : question text
          "answer" : answer text
        },
        {
          "speaker" : SPEAKER1
          "spoke" : spoken text
        },
        {
          "question" : question text
          "answer" : answer text
        }
      ]
    },
    {
      "examiner" : EXAMINER2,
      "examination" : [
        {
          "question" : question text
          "answer" : answer text
        },
        {
          "speaker" : SPEAKER2
          "spoke" : spoken text
        }
      ]
    }
  ]
}
```

*FIG. 6*

```
{
    "deposition": [{
        "examiner": "Examiner 1",
        "examination": [{
            "question": {
                "text": "question text",
                "startingPage": 30,
                "endingPage": 31,
                "startingLine": 24,
                "endingLine": 1
            },
            "answer": {
                "text": "answer text",
                "startingPage": 31,
                "endingPage": 31,
                "startingLine": 2,
                "endingLine": 6
            }
        }]
    }]
}
```

*FIG. 7*

Page and Line Summary

Deponent: MICHAEL PRUITT
Date: SEPTEMBER 23, 2002
Style: SUSAN MYLES and LINDA .L. McWHORTER, Individually and on behalf of All Others Similarly Situated, Plaintiffs, VS. MILLEP FOREST COMPANIES, INC., a Corporation
Case#: 00-L-121
Jurisdiction: IN THE CIRCUIT COURT THIRD JUDICIAL CIRCUIT MADISON COUNTY ILLINOIS

| Page | Line | Summary |
|---|---|---|
| 10 | 16-13 | Q: And why did you pick Cools?<br>A: The menthol, and some of my friends were smoking that brand. |
| | 24-23 | Q: why'd you pick those?<br>A: I was looking for something with less tar and nicotine and a lighter cigarette.<br>Q: why did you want -- why did you want less tar and nicotine?<br>A: I felt that it was healthier for me, and I wanted to reduce my intake of tar and nicotine. |
| 10-11 | 6-1 | Q: Did the CoolMilds taste any different from the -- the Cools you'd been smoking before?<br>A: I can't really say I noticed anything different in the taste, just was looking for a reduction in the tar and nicotine levels. |
| 11 | 11-5 | Q: okay. And had you seen anything that had made you want to get a lower tar and nicotine cigarette? what was it that that gave you the urge to do that?<br>A: Being health conscious and -- and being involved with -- with sports and things like that, just wanted to -- couldn't break the addiction, so I felt smoking something with less tar and nicotine would was healthier for me. |
| | 20-10 | Q: And you felt you were addicted at that time, when you switched to CoolMilds?<br>A: Yes. |
| | 23-21 | Q: was there any new show about the risks of smoking that you'd watched or -- or any conversation with a doctor or friend that had led you to want a lower tar and nicotine cigarette?<br>A: Not that I can recall.<br>Q: And about what year was it you switched to Cool Mild?<br>A: Probably '80. Somewhere around there. |
| 12-13 | 5-1 | Q: How long did you stick with SlalomLights?<br>A: Probably another two or three years. |
| 13 | 10-6 | Q: And so you switched to -- you first smoked a Mansboro Menthol Light around about 1985, give or take a year or two?<br>A: Correct. |
| | 14-9 | Q: You know my next question, why did you pick Mansboro Menthol Lights? |

1310 — Page and Line Summary

1320 — Deponent: MICHAEL PRUITT
Date: SEPTEMBER 23, 2002
Style: SUSAN MYLES and LINDA .L. McWHORTER, Individually and on behalf of All Others Similarly Situated, Plaintiffs. VS. MILLER FOREST COMPANIES, INC., a Corporation
Case#: 00-L-121
Jurisdiction: IN THE CIRCUIT COURT THIRD JUDICIAL CIRCUIT MADISON COUNTY ILLINOIS

1360

1370

1330 —

| Page | Line | Question-Answer Pairs | Declarative Sentences |
|---|---|---|---|
| 10 | 16-13 | Q: And why did you pick Cools? A: The menthol, and some of my friends were smoking that brand. | I picked menthol, and some of my friends were smoking that brand. |
|  | 24-23 | Q: why'd you pick those? A: I was looking for something with less t a r and nicotine and a lighter cigarette. Q: why did you want -- why did you want less tar and nicotine? A: I felt that it was healthier for me, and I wanted to reduce my intake of tar and nicotine. | I would pick those I was looking for something with less tar and nicotine and a lighter cigarette. Why I want less tar and nicotine? I felt that it was healthier for me, and I wanted to reduce my intake of tar and nicotine. |
| 10-11 | 6-1 | Q: Did the CoolMilds taste any different from the -- the Cools you'd been smoking before? A: I can't really say I noticed anything different in the taste, just was looking for a reduction in the tar and nicotine levels. | I cannot really say I noticed anything different in the taste, just looking for a reduction in the tar and nicotine levels. |
| 11 | 11-5 | Q: okay. And had you seen anything that had made you want to get a lower tar and nicotine cigarette? what was it that that gave you the urge to do that? A: Being health conscious and -- and being involved with -- with sports and things like that, just wanted to -- couldn't break the addiction, so I felt smoking something with less tar and nicotine would was healthier for me. | I have seen anything that made me want to get a lower tar and nicotine cigarette. Being health-conscious and being involved with sports and things like that, could not break the addiction, so I felt smoking something with less tar and nicotine would be healthier for me. What was it that that gave the urge to do that being health conscious and being involved with sports and things like that, just wanted to the addiction, so I felt smoking something with less tar and nicotine would was healthier |

FIG. 13C

| Class | DS-M | | | DS-LDC | | |
|---|---|---|---|---|---|---|
| | P | R | F1 | P | R | F1 |
| B | 0.92 | 0.91 | 0.91 | 0.93 | 0.91 | 0.92 |
| EB | 0.86 | 0.86 | 0.86 | 0.9 | 0.9 | 0.9 |
| ED | 0.84 | 0.75 | 0.79 | 0.85 | 0.87 | 0.86 |
| EC | 0.74 | 0.81 | 0.77 | 0.85 | 0.72 | 0.78 |
| PPC | 1.00 | 1.00 | 1.00 | 1.00 | 1.00 | 1.00 |
| TR | 0.59 | 0.76 | 0.67 | 0.87 | 1.00 | 0.93 |
| EE | 0.83 | 1.00 | 0.91 | 0.9 | 0.91 | 0.9 |
| IP | 0.80 | 0.80 | 0.80 | 0.85 | 0.79 | 0.81 |
| DP | 0.57 | 0.57 | 0.57 | 0.67 | 0.67 | 0.67 |
| OPS | 0.77 | 0.79 | 0.78 | 0.88 | 0.88 | 0.88 |
| PRD | 0.81 | 0.89 | 0.85 | 0.89 | 0.86 | 0.87 |
| O | 0.84 | 0.76 | 0.80 | 0.9 | 0.92 | 0.91 |
| Avg. | 0.83 | 0.83 | 0.83 | 0.89 | 0.89 | 0.89 |

*FIG. 14*

METHODS AND SYSTEMS FOR GENERATING SUMMARIES GIVEN DOCUMENTS WITH QUESTIONS AND ANSWERS

CROSS-REFERENCE TO RELATED APPLICATIONS

This application claims the benefit of and priority to U.S. Provisional Patent Application No. 63/039,725, entitled "METHODS AND SYSTEMS FOR GENERATING SUMMARIES GIVEN DOCUMENTS WITH QUESTIONS AND ANSWERS," filed Jun. 16, 2020, the content of which is hereby incorporated by reference herein in its entirety. This application is also related to U.S. Non-Provisional patent application Ser. No. 17/113,880, entitled "METHODS AND SYSTEMS FOR GENERATING DECLARATIVE STATEMENTS GIVEN DOCUMENTS WITH QUESTIONS AND ANSWERS," filed Dec. 7, 2020, the content of which is hereby incorporated by reference herein in its entirety.

BACKGROUND

Summary generation can be valuable for support of professionals that use information retrieval, question-answering, and other services. For example, legal professionals peruse multiple documents that pertain to a case, e.g., when preparing for a brief, mediation, or trial. One such set of documents includes the legal depositions that capture the conversation between an attorney and a deponent for a given case. The deponents can be of different types, ranging from plaintiff to expert or fact witnesses. To ensure that the deponent testimony is analyzed for facts that are relevant to the case, legal firms generate summaries for the depositions, that are used by attorneys and paralegals. These summaries provide the relevant information in a shorter document. The task of generating the summaries is time consuming and expensive, depending on the case and the length of the deposition.

Using traditional methods to generate summaries, starting from their raw form, results in poor summaries. This happens because of the way the text is structured for question and answer sessions. For example, a question and answer document captures the conversation between a questioner and an answerer in an 'as-is' manner. These conversations are in the form of question-answer (QA) pairs. Not all of these questions or answers are in a complete form; there are interruptions by either party, and they may abandon or veer off from the current conversational thread. Another challenge with the question-answer based structure is that the context of the conversation is spread over both questions and answers, so treating them atomically often leads to confusion.

Traditional summarization systems can be trained on simple declarative sentences (DS) to generate summaries. The various extractive methods select candidate summary sentences based on different techniques. The deposition QA pairs, transformed to a canonical form consisting of declarative statements, then can be used to generate abstractive or extractive summaries using existing summarization techniques, or adaptations of such. However, running these methods on canonical or declarative sentences in a legal deposition can result in sentences that sometimes lack context. Though the sentences identified could be useful when included in a summary, the lack of surrounding context makes it difficult to comprehend a summary that is made up only of sentences of such a kind. The overall summary ends up being incoherent and full of disconnects, even though the included summary sentences are useful. As a result, there is a need for improved techniques for automated summarization systems.

BRIEF DESCRIPTION OF THE DRAWINGS

Further aspects of the present disclosure will be readily appreciated upon review of the detailed description of its various embodiments, described below, when taken in conjunction with the accompanying drawings.

FIG. 2 shows an example of a page of a deposition transcript, according to various embodiments of the present disclosure.

FIG. 3 shows an example of a page from a version of a deposition with four original pages shrunk onto one condensed page, according to various embodiments of the present disclosure.

FIG. 5 shows an example of a page of a deposition transcript that after parsing can yield question-answer groups and then a question-answer data structure, according to various embodiments of the present disclosure.

FIG. 6 shows an example of a question-answer data structure generated from question-answer groups parsed from an examination portion of a deposition transcript, according to various embodiments of the present disclosure.

FIG. 7 shows an example of a question-answer data structure generated from question-answer groups parsed from an examination portion of a deposition transcript, that includes information about pages and lines, according to various embodiments of the present disclosure.

FIGS. 13A-13C show examples of summaries generated by components of the network environment, according to various embodiments of the present disclosure.

FIG. 14 shows example classification results for aspect classification when using the custom trained language model for classification, according to various embodiments of the present disclosure.

DETAILED DESCRIPTION

Figure 1:
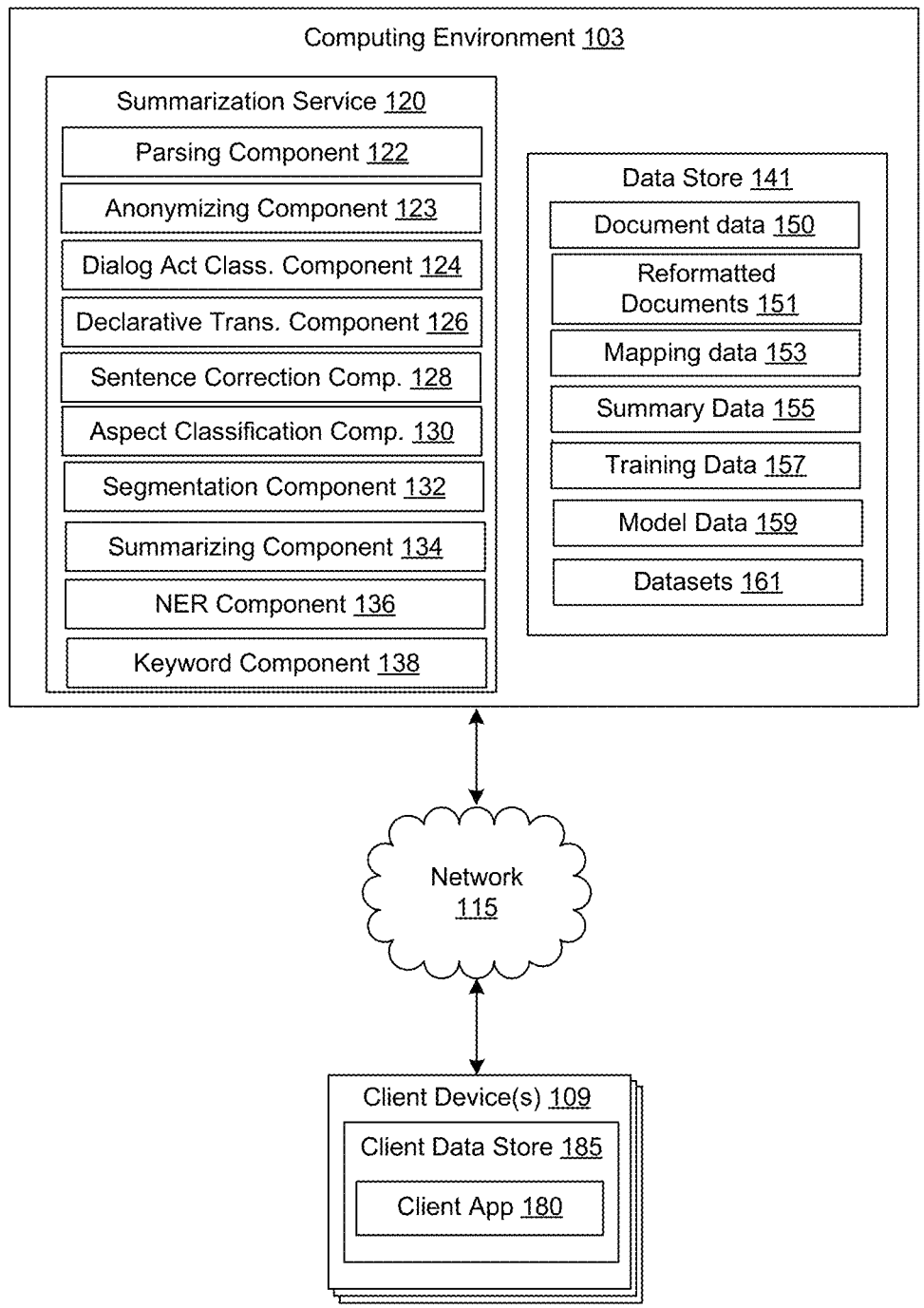
FIG. 1 is example of a networked environment for generating summaries from documents containing questions and answers, according to various embodiments of the present disclosure.

The present disclosure generally relates to generation of summaries in support of a variety of enterprises that involve information retrieval, question-answering, and other services. Text that includes questions and answers is processed through a pipeline that includes steps involving pre-processing, parsing, classification of dialog acts, transformation into declarative statements, correction of transformed statements, classification as to aspects, scoring of statements, segmentation, summarization of segments, and integration into summaries of varying lengths.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure.

All publications and patents cited in this specification are cited to disclose and describe the methods and/or materials in connection with which the publications are cited. All such publications and patents are herein incorporated by reference as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of computer science and the like, which are within the skill of the art. Such techniques are explained fully in the literature.

The process can be initiated by scanning, uploading, or otherwise providing documents that include text that is comprised in part of a plurality of questions and answers. Two of the categories of such documents include those that are sworn and those that are unsworn. Some of these come from the legal domain. A set of example types of such documents, that could be sworn, could be a transcript of a deposition, examination, interview, or testimony, such as of an expert or witness. These arise in a variety of settings, including a sworn deposition, trial, hearing, legislative (e.g., at state or national level) testimony, or examination under oath (EUO, as during a procedure related to an insurance policy).

Another set of example types of such documents, that could be unsworn, could be a Frequently Asked Question (FAQ) file, or an interview transcript related to the media, a witness, an expert, a job, or a medical issue. Additional examples include quizzes, debates, fact finding discussions, Socratic dialogs, and related educational forms. A person of ordinary skill in the art would recognize a broad range of other types of documents that are comprised in part of a plurality of questions and answers.

Such documents, once received, can be pre-processed and parsed so the text can be easily processed. The processing handles documents in various formats, like Portable Document Format (PDF), and in various styles, e.g., one original page per document page, or multiple (e.g., four) original pages per document page. Identification of the front, body, and closing portions of the document is necessary. Identification of each question and each answer is necessary.

The documents are sometimes received as scanned images of the original document. The scanned images of the original document are typically either presented in a single page layout or a four-page 2×2 grid layout. Identifying the layout and then using suitable techniques to retrieve text from the images using Optical Character Recognition (OCR) techniques is necessary.

Once the document content is parsed into a desired format with the questions and answers each identifiable individually, and optionally associated with location such as page and line number, a transformation to a canonical form is a useful step that can lead to easier processing of the text.

Generally, a summarization pipeline can invoke the various different components described in works included by reference and in the current disclosure. The pipeline components can be invoked serially, concurrently, and with partial concurrence. In the case of serial execution, the output of one component is the input to the next component. Methods were developed to annotate any such input file with the results as generated by a suitable processing component. For example, starting with the output of the parsing component, a document can include question-answer pairs. The dialog act classification component adds two additional columns to each row of this input file, and generates an output file that has the original question-answer pairs in each row with the additional two columns. This pattern is followed throughout the pipeline. As would be familiar to one skilled in the art, in the interest of speed and efficient use of resources, databases instead of files could be used for storing results. As would be familiar to one skilled in the art, in the interest of speed and efficient use of resources, a parallelized version of the pipeline can have some stages of the pipeline run in parallel, such as when different question-answer pairs are processed at the same time by dialog act classification code, or can have different pipeline streams run in parallel, such as when different question-answer pairs are processed at the same time by a pipeline of dialog act classification plus declarative transformation plus sentence correction codes.

The input file can be parsed by the parsing component and the output can be generated as a CSV file that has the question-and-answer texts in two different columns where each row has one question and an answer. The content is spread over multiple rows. Optionally, anonymization is carried out. The file generated in the previous step is processed by the dialog act classification component, which generates another output file, that adds to each row two additional columns, for the question-and-answer dialog acts. The file generated in the previous step is processed by the declarative transformation component, which generates another output file, that adds to each row an additional column for the declarative sentence. The file generated in the previous step is processed by the sentence correction component, which generates another output file, that adds to each row an additional column for the corrected declarative sentence. The file generated in the previous step is processed by the aspect classification component, which generates another output file, that adds to each row an additional column for the aspect of the QA pair. The file generated in the previous step is processed by the segmentation component, which generates another output file, that adds to each row two additional columns for the segment boundary and segment identifier. The segmentation component generates a '1' for a boundary and a '0' for a non-boundary. The segment identifier is a running identifier that is incremented whenever a boundary is detected. The file generated in the previous step can be processed by the summarization component, which can generate another output file, that adds to each row an additional column. This column contains the value of '1' if the data in the row is identified to be included in the summary as a candidate, else it is marked as a '0'.

The components can have multiple implementations of their functionality using different methods. To achieve such a feature, interfaces were defined for each component. The interface for the components enforced this functional contract. A component implementation can be readily swapped with another one as long as the same interface is implemented. This provided a plug-in functionality to the whole pipeline where improved methods could replace the existing method without affecting the other parts of the pipeline.

Another part of the pipeline is the data contract for each component. Each component adheres to a schema for the input and output data. This can be enforced as part of the interface in some examples. In addition, for the pipeline to be implemented so as to be executed in a serial fashion, an alternative method can also be used based on the service invocation pattern. Methods can define service or Application Programming Interface (API) contracts for each component. An API based on Representational State Transfer (REST) can be hosted on a server that operates in a decoupled and distributed fashion independent of other services. The components had a REST interface for their methods. Different components had different service contracts. Multiple implementations of the components can be supported with such a pattern as long as the contract was implemented by the service component.

To customize the pluggability of different implementations of the components, a configuration file can be used. A new implementation of a component based on the defined contract can be hosted on a new endpoint that is reachable and where the service is running. The service can be changed in the configuration file to point to the new endpoint. This ensures that the existing components are not affected by the introduction of a new implementation of a new component.

To extend upon the pluggability as described in the previous paragraphs, API gateways or routers can be used that can serve as configuration hubs to manage the service endpoints. These gateways can also provide scalability by load balancing across multiple endpoints hosting the same component. This is useful for components that require heavy processing and have relatively higher response times. Adding multiple instances of such services for these components can provide scalability that can be ramped up and down based on the forecasted or experienced (real-time) load.

The whole pipeline can be created as one single unit that consists of all the components running together as a set of Docker® containers; for example, summarization is in a container. These containers can run together as one independent or atomic unit. Such an architecture is supported by running these containers with Docker® Swarm® or Kubernetes®. The collection of containers can be defined in a declarative manner using configuration files. These configuration files can define the expected runtime state of the whole Swarm® or Pod (Kubernetes®).

The terms "declarative sentence", "declarative statement", and "canonical form" are used interchangeably. The transformation to a canonical form consisting of declarative sentences sometimes results in sentences that have grammatical, semantic, or lexical errors. Correcting such sentences is a useful step to ensure that the downstream processing steps can benefit from an input that is grammatically correct and retains the semantic meaning as expressed in the original question-answer pairs.

Once the corrected canonical sentences are available, they can be classified into their respective aspects. The classification is done with machine learning methods, either unsupervised or supervised, that can involve training a classifier in advance, and then applying the resulting classifier with its trained model. Multiple approaches for this step have been developed, including using deep learning, as would be familiar to one skilled in the art.

The underlying or base language model used for classification can be trained further to align to a particular domain, e.g., the legal domain. The base model can be fed the canonical sentences and be trained for a duration of time. Once the model is trained, it can be saved and used to classify aspects. Using a model tuned with domain specific documents results in improved classification efficacy.

Also, the canonical sentences can be used to identify segment boundaries in the deposition. Supervised and unsupervised methods have been developed to identify these segment boundaries, including deep learning, as would be familiar to one skilled in the art.

The canonical sentences can be used to extract entities and keywords present in them. Frequency and probabilistic techniques can be used to score and/or rank the sentences further, e.g., based on the prevalence of entities and keywords contained in them. The top-n % of sentences from this ranked list can be used as a list of candidate summary sentences. This list can be further trimmed using, possibly iterative, techniques like Maximal Marginal Relevance (MMR) to select and/or eliminate sentences, so the resulting summary sentences are salient, diverse, and relevant.

The original document that has been augmented with corrected canonical sentences, extracted information, scores, ranks, aspects, and segment boundaries can be used to generate the final summary. The summaries can be generated using abstractive and/or extractive techniques.

The summarization pipeline can integrate the different components to generate summaries. That integration can be improved through parallelization and optimization, as would be familiar to one skilled in the art.

Other systems, methods, features, and advantages of this invention will be or become apparent to one with skill in the art upon examination of the following drawings and detailed description. It is intended that all such additional systems, methods, features, and advantages be included within this description, be within the scope of the present disclosure, and be protected by the accompanying claims.

The present disclosure incorporates by reference the entirety of each of: (a) U.S. Provisional Patent Application Ser. No. 62/945,202, entitled "METHODS AND SYSTEMS FOR GENERATING DECLARATIVE STATEMENTS GIVEN DOCUMENTS WITH QUESTIONS AND ANSWERS;" (b) U.S. patent application Ser. No. 17/113,880, entitled "METHODS AND SYSTEMS FOR GENERATING DECLARATIVE STATEMENTS GIVEN DOCUMENTS WITH QUESTIONS AND ANSWERS;" and (c) U.S. Provisional Patent Application Ser. No. 63/039,725, entitled "METHODS AND SYSTEMS FOR GENERATING SUMMARIES GIVEN DOCUMENTS WITH QUESTIONS AND ANSWERS."

FIG. 1 is an example of a networked environment 100 for generating summaries from documents containing questions and answers. The networked environment 100 can include a computing environment 103 and one or more client devices 109 in communication via a network 115. The computing environment 103 can include a data store 141 and a summarization service 120. The summarization service 120 can include a parsing component 122, an anonymizing component 123, a dialog act classification component 124, a declarative transformation component 126, a sentence correction component 128, an aspect classification component 130, a segmentation component 132, a Named Entity Recognition (NER) component 136, a keyword component 138, and a summarizing component 134. While the various components of the summarization service 120 can be discussed separately, the functionalities discussed can be provided alternatively as part of one or any number of executable instructions or applications of the summarization service 120.

The computing environment 103 can be embodied as a computer, computing device, or computing system. In certain examples, the computing environment 103 can include one or more computing devices arranged, for example, in one or more server or computer banks. The computing device or devices can be located at a single installation site or distributed among different geographical locations. As further described below, the computing environment 103 can include a plurality of computing devices that together embody a hosted computing resource, a grid computing resource, or other distributed computing arrangement. In some cases, the computing environment 103 can be embodied as an elastic computing resource where an allotted capacity of processing, network, storage, or other computing-related resources varies over time. The computing environment 103 can also include or correspond to one or more virtualized server instances that are created in order to execute the functionality described herein.

The computing environment 103 can also be embodied, in part, as various functional (e.g., computer-readable instruction), logic (e.g., device, circuit, or processing circuit), or functional and logic elements that can be executed by the computing environment 103 to direct the computing environment 103 to perform aspects of the examples described herein.

The parsing component 122 can parse the contents of a question-answer document into question-answer groups and store those question-answer groups in a question-answer data structure. In some examples, the parsing component 122 can receive a question-answer document from, for example, the client device over the network 115 and store the original question-answer document in the document data 150. The question-answer document can include questions and answers defined as one or more of image data and text data. In other examples, the question-answer document can be accessed directly from the document data 150 or other location in the network 115.

The question-answer document can include text and or images representing a question-answer document, which can include a series of questions and answers. For example, the question-answer document can represent a transcript of a deposition. While the term "question-answer document" is used here to describe the data processed by the parsing component 122, the data being processed can be in a file (e.g., CSV), data structure (e.g., JSON or tabular), or database (e.g., set of tables, object store), so these terms are used interchangeably in the present disclosure, as can be appreciated.

Question-answer documents can be stored in a wide variety of file formats like .pdf, .docx, .rtf, .txt, .ocr, .csv, and other suitable formats as can be appreciated. So, the parsing component 122 can use a generalized technique to easily parse question-answer documents across all formats in a format agnostic way. For example, if the question-answer document is in the form of a file, the parsing component 122 can load or use a particular file reader chosen based on the file extension.

The parsing component 122 can read the raw content of the question-answer document to determine whether the raw content of the question-answer document is in a multi-column format. The parsing component 122 can load a multi-column parser if the question-answer document is in a multi-column format. On the other hand, the parsing component 122 can load a single-column parser if the question-answer document is not in a multi-column format.

The parsing component 122 can identify questions and answers in the question-answer document. The parsing component 122 can add these question-answer groups into a question-answer data structure and store the data structure in the document data 150.

The anonymizing component 123 can anonymize the contents of question-answer groups. In some examples, the question-answer groups can be parsed from a question-answer document by the parsing component 122. Anonymization can be used to keep confidential personally identifiable information (PII) present in question-answer documents. For example, while one public dataset was open access, one legal deposition data set included PII that should be kept confidential for privacy and legal reasons. Accordingly, there is a need to anonymize or obfuscate the PII present in depositions or other question-answer documents.

In some examples, the anonymizing component 123 can anonymize instances of personally identifiable information (PII) present in the question-answer groups passed from a question-answer document to prevent disclosure of confidential information that may be present in the question-answer document. While the term "personally-identifiable information (PII)" is used in the discussion in reference to anonymizing information fields, the term "personally-identifiable information (PH)" can mean any personally-identifiable information, confidential information, private information, or any information capable of being anonymized, as can be appreciated.

For example, the parsing component 122 or anonymizing component 123 can anonymize the following kinds of PII as part of handling confidential information:
1. Addresses
2. Ages
3. Dates
4. E-mail IDs
5. Locations
6. Names of individuals
7. Names of organizations
8. Phone numbers Other kinds of PII can also be anonymized as can be appreciated.

The anonymizing component 123 can use the question-answer groups generated by the parsing component 122 with other mapping as can be appreciated. Table 1 provides examples of question dialog act categories. However, any categories and subcategories can be defined and classified using the techniques described.

TABLE 1

Question Dialog Act Categories

| Category | Description | Example |
| --- | --- | --- |
| wh | This is a wh-* kind of question. These questions generally start with question words like who, what, where, when, why, how, etc. | What time did you wake up on the morning the incident took place? |
| wh-d | This is also a wh-* kind of question. But if there is more than one statement in a what question, it is a what-declarative question. These questions have some information prior to the actual question which relates to the question. | You said generally wake up at 7:00 am in the morning. But what time did you wake up on the morning the incident took place? |
| bin | This is a binary question. These are questions that can be answered with a simple "yes" or "no". | Is that where you live? |
| bin-d | This is a binary-declarative question which can also be answered with a "yes" or "no". But, in a binary-declarative question, the person who asks the question knows the answer and asks for verification. In contrast, a binary question indicates the examiner seeks to know which is the actual answer. | That is where you live, right? |
| qo | This is an open question. These questions are general questions which are not specific to any context. These questions are asked to know the opinions of the person who is answering. | Do you think Mr. Pace made a good decision? |
| or | This is a choice question. Choice questions are questions that offer a choice of several options as an answer. They are made up of at least two parts, which are connected by the conjunction "or". | Were you working out for fun or were you into body building? |

Named Entity Recognition (NER) component 136 methods to identify the different kinds of PII fields. These PIE fields may be present in the metadata of the question-answer document as well as in the corresponding question-answer groups.

In some examples, the replacement information can have the form <Field-Type>Index. For example, if the city of "Blacksburg" occurs in the deposition, it can be assigned an identifier like "City1". The index values for each type can be recorded, and any recurrence of the same value can be assigned the same identifier throughout the deposition. Mappings can be kept of the alias for each actual entity value, allowing generation of the original document from an anonymized version. All the fields can use this convention for anonymization. In the case of the names of individuals, a different approach can be used, to handle when different portions of a name are used to refer to the same individual.

The dialog act classification component 124 can classify questions and answers in one or more question-answer groups as to dialog act. Given a question-answer group comprising a question and at least one answer, the dialog act classification component 124 can classify the question into a question dialog act category or multiple question dialog act categories. The dialog act classification component 124 can classify the at least one answer into an answer dialog act category. In some examples where the at least one answer comprises two or more answers, the two or more answers can all be classified into a single answer dialog act category, can each be classified into separate answer dialog act categories, can each be categorized into multiple answer dialog act categories, or any other combination of the two or more answers and answer dialog act categories as can be appreciated. Between two or more answers and one or more answer dialog act categories, there can be an injective mapping, a surjective mapping, a bijective mapping, or any In some cases, for example, if the number of dialog acts in a document exceeds a threshold, then the "wh" category can be separated into subcategories. This enables specific comprehension techniques to be used on each subcategory as the sentences are varied for each of the subcategories. Table 2 lists and describes each sub-category for the "wh" parent category.

TABLE 2 wh-Question Dialog Act Subcategories

| Category | Description | Example |
| --- | --- | --- |
| num | It is a what question specific to numeric quantities. | What is the age of your daughter? |
| hum | It is a what question specific to human beings. | What is the name of your daughter? |
| loc | It is a what question specific to locations. | What is the name of the city where your daughter lives? |
| ent | It is a what question specific to other entities. | What is the email address of your daughter? |
| des | Is it a what question which asks for a description. | What were you doing there at that point of time? |

Dialog act categories can also be assigned to answers from a document. Table 3 provides examples for answer dialog act categories.

TABLE 3

Answer Dialog Act Categories

| Category | Description | Example |
| --- | --- | --- |
| y | It is a category where a person answering the question means yes. The answer sentence can take various forms and the answeer need not be exactly "yes". | "yes", "yeah", "Of course", "definitely it is", "that's right", "I am sure", etc. |
| y-d | It is a category where a person answering the binary question not only says yes but also gives an explanation for this answer. | Yes. I play badminton because my doctor advised me to. |
| y-followup | The answer is yes, but in the answer, there is another question which pertains to the question asked. | Yes I have seen them. But what do you mean by inside the elevator? |
| n | It is a category where a person answering the question means no. Again, the answer need not be exactly "no". | "No", "I don't think so", "certainly not", "I am afraid not", etc. |
| n-d | It is a category where a person answering the binary question not only says no but also gives an explanation for this answer. | No. I am not interested in playing Cricket because it takes a lot of time |
| n-followup | The answer is no, but in the answeer, there is another question which pertains to the question asked. | That is not me. Do you think that is me? |
| sno | It is a statement which is a non-opinion. There is an information statement made by the person answering the question. | I retired from my job in 2010. |
| so | It is a statement which is an opinion of the person answering, rather than a general statement. | I believe retiring from my job was the best decision I made. |
| ack | It is a response which indicates acknowledgment. | "Okay", "Um-hum", "I see", etc. |
| duo | It is a response given when the person doesn't know, or doesn't recall, or is unsure about the answer to the question asked. | I don't recall what happened that day |
| confront | The answer contains no information. It is a confrontation by the deponent to the question asked. | So do you say that I have given you the wrong information? |

To identify dialog acts, the dialog act classification component 124 can use different classifiers based on, for example, deep learning methods that have achieved state-of-the-art results in multiple other tasks. The dialog act classification component 124 can also use simple classifiers that employ sentence embeddings followed by a fully connected neural network to check for efficacy of sentence embeddings like bidirectional encoder representations from transformers (BERT) in dialog act classification. The following describes examples of different classification methods used to classify the dialog acts.

As an example, the dialog act classification component 124 can use a convolutional Neural Network (CNN) that can be used to capture the n-gram representation of a sentence using convolution. A window size provided as a parameter can be used to define the number of words to be included in the convolution filter. The convolution operator can capture a bi-gram representation.

The dialog act classification component 124 can apply a CNN to learning a sentence representation. In some examples, a feed-forward neural network layer can be added in front of the representation layer to finally classify the dialog act for a given sentence. Tokens from a sentence can be transformed into word vectors using, for example, word2vec and fed into the network. This can be followed by the convolution and max-pooling operations. The final sentence can have a fixed size representation irrespective of sentence length. As the system trains, the network can learn a sentence embedding as part of this layer. This representation can be rich, since it captures the semantic and syntactic relations between the words.

As another example, the dialog act classification component 124 can use bi-directional long short-term memory (LSTM) with an attention mechanism to capture important information contained in a sentence. It may not use any classical natural language processing (NLP) system-based features. Even though a CNN can capture some semantic and syntactic dependencies between words using a larger feature map, it may struggle to capture the long-term dependencies between words if the sentences are long. LSTM-based network architectures are better equipped to capture these long-term dependencies since they can employ a recurrent model. The context of the initial words can make their way down the recurrent chain based on the activation of the initial words and their gradients, during the back-propagation phase.

The dialog act classification component 124 can feed words into the network using their vector representation. The network can process the words in both directions. This can help the network learn the semantic information not only from the words in the past, but also from the words in the future. The output layers of both the directional LSTMs can be combined as one, using an element-wise sum. An attention layer can be added to this combined output, with coefficients for each output unit. These coefficients can act as the attention mechanism; attention priorities are learned by the system during the training phase. These coefficients can capture the relative importance of the terms in the input sentence. The word embeddings were also learned as part of the training; training data can be stored in training data 157. Dropout was applied to the embedding, LSTM, and penultimate layers. L2-norm based penalties were also applied as part of the regularization.

Further, the dialog act classification component 124 can generate sentence embeddings of the questions and answers via a BERT pre-trained model. BERT can be fine-tuned to any NLP task by adding a layer on the top of this architecture which makes it suitable for the task. Its high-level architecture can consist of various components like embeddings and transformers.

The dialog act classification component 124 can use the BERT reference architecture, with a feed-forward neural network layer added on top of BERT sentence embeddings. The aim is to classify text with length that varies from roughly a portion of one sentence to a large paragraph. Further, a single sentence classification, not a sentence pair classification, can be performed, as is typical with BERT.

The declarative transformation component 126 can transform question-answer groups into declarative sentences. Once a question-answer group is classified based on dialog act, the declarative transformation component 126 can transform the question-answer group into a canonical or simple form.

The declarative transformation component 126 can first remove noise in the text of the question-answer groups so that transformation of the question-answer groups can be performed more efficiently. In some examples, noise can be mostly present in the question text. Table 4 shows some sample questions with the noise that can be removed via pre-processing. Through analysis of examples, a dictionary was created of noisy sentences and words, along with some rules based on regular expressions, that the declarative transformation component 126 can use to remove the noise.

TABLE 4

Questions, with the noisy text in bold

So, you also indicated that Mr. Williams's injury might require intervention as we discussed already; is that correct?
Okay. And, the reduction that you spoke about earlier in the diagram, you said that reduction was closed, correct?
I see. So, did you think it was the bartender?

For some dialog acts, the question and answer text can comprise a well-formed sentence in the beginning and the end, respectively. This was observed for the question dialog acts [bin-d, wh-d] and answer dialog acts [y-d, n-d]. The first two examples in Table 5 show the question text having a well-formed sentence before the actual question. For the last two examples, the answers are in binary form in the beginning followed by a well-formed sentence.

TABLE 5

Questions and answers that include a well-formed sentence
Declarative parts shown in bold.

| Text | Dialog Act |
| --- | --- |
| And the damage that you showed earlier in the diagram, you said that damage was accidental? | Q: bin-d |
| And a fracture that runs through the whole arm joint is a pretty severe fracture. When was the examination done? | Q: wh-d |
| Yes. We sent out this to that operating company. | A: y-d |
| No. I did not read any depositions or I think the second part is kind of general, but I haven't read any depositions. | A: n-d |

To process the questions with the well-formed sentence, the declarative transformation component 126 can break the question text into a simple sentence and the actual question. This yielded two question-answer groups from each question. The first question-answer group was the well-formed sentence with the answer dialog act of "y." The answer dialog act was chosen as "y" since the statement being made is always true. The second question-answer group included the actual question from the question text along with the answer text and dialog act.

To process the answers with the well-formed sentences, the declarative transformation component 126 can remove the binary answers from the answer text and create a new question-answer group, with the answer text as the question and the answer dialog act as "y." The answer dialog act was chosen as "y" since the statement is made by the deponent and the process involves paraphrasing the answer without judging its veracity. Having new question-answer groups after the pre-processing can enable the next stage of transformation to use the custom methods for each dialog act without having to handle such complexities of the questions and answers.

In some examples, the declarative transformation component 126 can transform question-answer groups using techniques in natural language processing (NLP). Common patterns associated with deposition question-answer groups have been observed, according to the different question and answer dialog acts.

For each such common pattern, the declarative transformation component 126 can use NLP parsing techniques like chunking and chinking to create custom transformation rules to transform the text into a canonical form corresponding to declarative sentences. Information from text can be extracted using chunking and chinking. These techniques can use regular expressions based on the part-of-speech (POS) tags, to create a parse tree from a given sentence. Chunking can refer to the process of extracting chunks from a sentence based on certain POS tag rules.

Using chunking, the declarative transformation component 126 can get to specific parts of the parse trees that are of interest. These rules can also be based on POS tags and can be represented using simple regular expressions (regexs). Meaningful parts of a sentence can be extracted based on these rules. In some examples, a regex-based search pattern can be used to identify chunks. This can isolate a part of the sentence into a chunk. The words within this chunk can be rearranged and/or replaced based on different scenarios. The chunk can then be joined back to the original sentence from which the chunk was extracted. Chinking can refer to the process of defining what is not to be included in a chunk. A chunking process can create chunks, and chinking breaks up those chunks into more granular sequences using some rules that exclude parts out of the chunk.

In other examples, the declarative transformation component 126 can use deep learning techniques to transform question-answer groups. In deep learning based transformation, the OpenNMT Toolkit can be used to train sentence transformers for the different combinations of dialog act. Since training data was hard to obtain, and since it was not clear if all of the combinations of dialog act would be conducive to Deep Learning based transformation, Deep Learning based methods were developed for the combinations of [bin, y], [bin, n], [bin, y-d], and [bin, n-d].

The declarative transformation component 126 can build Deep Learning based transformation t into a prototype that can be used to evaluate the feasibility of using Deep Learning based methods. There are no known works in the area that have addressed the exact problem handled by the disclosed examples, so Deep Learning based models, as can be stored in model data 159, were investigated that could be applied to this task. This is a challenging problem since Deep Learning based models are dependent on a large number of training samples, that can be stored in training data 157, to learn something well. The challenge is even more serious with sequence-to-sequence based models, due to the large number of parameters in play in the encoder-decoder network. It is not desirable for the system just to memorize certain examples. Rather it is preferred for the system to learn how the question-answer group should be transformed, so the learned transformation algorithm would be sufficiently general.

The sentence correction component 128 can include grammatical error correction (GEC) of the declarative sentences generated by the declarative transformation component 126. The sentence correction component 128 can correct the declarative sentences generated by the declarative transformation component 126 to generate corrected sentences. The sentence correction component 128 can be trained for spoken language corpora, such as for the CoNLL-2014 Shared Task dataset, and so perform well on such data.

Declarative sentences generated from legal depositions and other document data 150 are generated automatically. Therefore, the type of syntactic, semantic, and lexical errors encountered in these sentences can be different. A BERT language model can be trained and verified to be fine-tuned for a specific NLP task. The BERT language model can be used to calculate a score for a corrected sentence based on intrinsic language modeling properties, and compare it against the original declarative sentence. If the score of the corrected sentence is better, the original sentence is modified.

Further, from analysis of the dataset, some common error patterns can be identified and corrected by applying some simple heuristic techniques. New heuristics alongside with the BERT scoring mechanism can be introduced in order to improve the performance of the system. The additional heuristics can include:

N-gram based swap: The auto-generated sentences can include some words which can be swapped. This type of error can be generally observed in the first few (e.g., within 12) words, as shown in Table 6. A window of size 'N' is selected and is iterated through the first 12 words to perform permutations in the window frame. The score for the entire sentence can be calculated, and the original sentence is modified if the score of the transformed sentence score is better.

TABLE 6

N-gram based swap example

| | |
|---|---|
| Input Sentence | do not do me recall waking up in the hospital. |
| Corrected Sentence | do me do not recall waking up in the hospital. |

One word Deletion: A single word is deleted, and the length normalized score of the sentence is calculated. The scoring technique used assigns a weight to each word, and so only the insignificant words are deleted. If the score of the modified sentence is better, it is used as the corrected sentence. Table 7 shows correction using deletion.

TABLE 7

One word deletion example

| | |
|---|---|
| Input Sentence | do me do not recall waking up in the hospital. |
| Corrected Sentence | me do not recall waking up in the hospital. |

One word Replacement: A dictionary for some common words can be created, for example, {I, me, my}. Each such entry can be paired with one or more candidate alternative replacements. If a word from the dictionary is encountered in the sentence, each alternative for that word is tried as a replacement. The score for the resulting new sentence is calculated for each of these alternatives and the sentence is modified if the score is better. Table 8 shows correction using replacement.

TABLE 8

One word replacement example

| | |
|---|---|
| Input Sentence | me do not recall waking up in the hospital. |
| Corrected Sentence | I do not recall waking up in the hospital. |

A dataset 161 can be utilized to verify accuracy. In some examples, a spell checker can be utilized as an additional heuristic to further improve performance.

Neural Machine Translation (NMT) based techniques can further correct the generated declarative sentences. Deep Learning based NMT methods focus on learning the context present in a sentence, and converting that into a sentence for a target language. Converting a sentence from a source language to a target language and converting it back into the source language has the ability to remove noise from the sentence. This is possible since the NMT models learn the context of the sentence in the source language and emit a sentence into the target language based on the context. Since these models are trained and verified on large datasets 161, the presence of noise does not hamper their conversion since the model has not been trained on a noisy sequence and the context captured by such models filters out the noise from the sequence.

Some noise filtration can use a single intermediate. This can have a variable degree of performance. For some languages, the performance is very good for certain kinds of sentences, but the result can be inconsistent. A set of 3 noise filtration languages (e.g., Spanish, French, and Portuguese) can also be used. In this way, at least one of the conversions can filter out the noise and retain the semantics of the original sentence. Based on this analysis, an ensemble of sentences in multiple languages can be used to form the final sentence. A noisy declarative sentence can be converted into a different language and back-translated to the original language (e.g., English). Some examples can use Spanish, French, and Portuguese as the three languages, but other sets of and number of multiple languages can be used.

In other words, sentence correction component 128 can machine translate each original noisy declarative sentence from an original language into "n" languages, and then machine-translate these translated sentences back into the original language. The sentence correction component 128 can use language models from the model data 159 using the back-translated sentences for sequence generation of a final corrected sequence, resulting in a final corrected sentence. For each sentence that needed to be corrected, a noisy source declarative sentence along with corrected sentences were generated using NMT based translation methods.

To correct a sentence, a probabilistic language model can be built using all (for example four or another selected number) of the sentences such as a set of declarative sentences. This language model can learn the bi-gram and tri-gram probabilities based on the sentences. Special tokens like BOS (beginning of sentence) and EOS (end of sentence) can be added to the sentences so that the language model can provide word probabilities for the first and last words in the sequence. For generation, a first token can be set as "BOS" and the language model can be probed to generate probabilities for all of the words in the vocabulary. The vocabulary can be the union set of words present in the sentences. To generate the sequence at each position, the top-k candidates can be selected from the vocabulary based on the word probabilities as evaluated by the language model. The value of k can be the beam width. The final corrected sequence can be generated iteratively using beam search and language model guidance that maximizes the collective probability score of the generated sequence.

As an example, Table 9 shows an original noisy sentence and the back-translated English sentences. The sentence correction component 128 can generate the corrected sequence is generated iteratively using the language model. Table 10 shows the sequence being generated iteratively using a beam width of size 2.

TABLE 9

The original sentence along with back-translated versions

| Sentence Type | Sentence Text |
|---|---|
| Original | I are where from originally Charleston, South Carolina. |
| French | I am from Charleston, South Carolina. |
| Portuguese | I am from where originally Charleston, South Carolina. |
| Spanish | I am originally from Charleston, South Carolina. |

TABLE 10

Example showing the iterative sequence generation using a beam width of size 2 and using the bi-gram probabilities from the language model

| Position | Generated Sequence |
|---|---|
| 1 | I |
|   | I |
| 2 | I are |
|   | I am |
| 3 | I am from |
|   | I am originally |
| 4 | I am from Charleston, |
|   | I am from originally |
| 5 | I am from Charleston, South |
|   | I am from Charleston, South |
| 6 | I am from Charleston, South Carolina |
|   | I am from Charleston, South Carolina |

The depositions can be processed using the sentence correction methods before using them with other components. In some cases, aspect classification, segmentation, and summarization can be performed on corrected sentences provided by the sentence correction component 128.

The aspect classification component 130 can use the deep learning methods described with respect to the dialog act classification component 124. Classifiers based on CNN, LSTM, and BERT can be used as described with respect to the dialog act classification component 124. However, the aspect classification component 130 can identify an aspect or topic for each sentence.

Identifying aspects discussed in the sentences of a deposition can be motivated by the limited success achieved when only other approaches are employed. Preliminary experiments starting with the declarative sentences resulting from the transformation, and feeding them into a summarization method pre-trained on news article corpora can lead to suboptimal results. The summaries thus generated omit important information and lack the cohesion and context required to be comprehended and used by a legal professional. Partly, this can occur because of a lack of domain understanding on the part of these methods, which have been trained on news articles that are markedly different in content and structure from, for example, legal depositions or another particular type of document from another domain or field.

For example, the news covers popular topics, subjects, people, organizations, and/or locations, as distinct from the specialized matters in legal disputes, sport interviews, FAQs, and so on. Further, key concepts often can be identified in the news based on repetition, or based on formulaic coverage of "who, what, when, where, why, how" discussions, while depositions often provide such coverage in background warm-up sections that attorneys largely ignore later. Regarding structure, news stories can have the most significant concepts mentioned in the beginning. Then these concepts are discussed in more detail further along in the article. Accordingly, the sentences with these words and concepts are identified as summary candidates that are processed further to generate either an extractive or abstractive summary. On the other hand, many important parts of depositions are present in the middle or end segments in the document. There may be very little repetition of some key concepts, such as when a key admission is made, and an attorney deliberately avoids allowing such a statement to be elaborated upon. In such cases, facts, once collected as part of the deposition, are rarely repeated in any other part of the deposition. This non-repetition thus diminishes the utility of simple frequency-based scores, that work so well in the news domain.

For a legal deposition summary, the summary service 120 can pick the content from the document in an objective and unbiased way. The summary service 120 can select and process information to be included in the summary such that it is factually correct. To comprehend a legal deposition better, understanding the requirements of the downstream tasks from a domain perspective would be useful. Consumers of legal deposition summaries can be interested in important parts that relate to the case pleadings or claim complaints. For example, in the example context of a dataset 161 of depositions associated with property and casualty insurance claims, it can be more important to have coverage of the core events that are mentioned in the pleadings and complaints as opposed to uniform coverage of the whole deposition document. Coverage of the details of the event, and the events before and after it, often are important for legal professionals.

Another challenge with legal depositions is that there are different deponent roles pertaining to a case. The focus of questioning varies based on the deponent type. Accordingly, different deponent types lead to different mixtures of aspects being discussed during their depositions. Grouping the aspects based on the deponent type can enable the summary service 120 to structure a summary in terms of aspect distribution and layout.

Events, entity mentions, and facts are present throughout the length of the deposition. Identifying the aspects covered in a deposition would allow a deposition to be broken up into its constituent topical parts. Summaries can be generated based on a predefined distribution and layout of different aspect sentences present in the deposition. Such topic-specific layouts and distribution can be identified and generated based on existing legal depositions and summaries (or other domain or topic-specific document data 150), and could be further refined based on case pleadings and deponent types. Identifying the various aspects of interest present in a legal deposition would help in other downstream tasks in addition to generating summaries.

The aspects in a deposition also can help in focused information retrieval, where aspects are associated with facets used in searching and browsing. Thus, a deposition could be presented to the end-user using aspects for one class of facets, letting them gauge the deposition content and aspect distribution at a high-level, and explore further by digging into each facet or combination of facets. An example of such exploration by a legal professional would be a review of all the segments that are of the aspect of type "Event Details", to ascertain the specific facts related to the actual event (or accident). Performing a focused search based on aspects would help retrieve results that are more relevant based on the chosen aspect. Consider, for example, the role of a witness familiar with the situation just before an accident. A search of person entity mentions for the relevant aspect of "Event Background" would present the user with the relevant results. Another important use of aspects would be to identify segments within a legal deposition that have the same thematic context and topical coherence. The segment metadata could be assigned an aspect label based on the majority aspect within the segment. These segments, with their associated aspect metadata, could be used to speed up the exploration of a set of legal depositions pertaining to a case.

To identify aspects, legal depositions (i.e., domain or topic-specific document data 150) and their summaries can be analyzed from a domain or topic-specific dataset such as accident/claim cases. The summaries in the dataset can be arranged in paragraphs, where each aspect in the summary was present in a different paragraph. A set of aspect categories can be defined, as in Table 11, and the aspect classification component 130 can be trained to identify aspect categories for the sentences.

TABLE 11

Examples of Aspect Categories for Accident/Claim Cases

| ID | Topic | Definition |
| --- | --- | --- |
| 1 | B (Biographical) | This topic covers the background of the witness, familoy, and work history, along with educational background, training, etc. |
| 2 | EB (Event Background) | This topic covers events that happened or conditions that existed just before the actual event (accident) that resulted in the legal claim. |
| 3 | ED (Event Details) | This topic covers all details about the accident even that resulted in the legal claim. |
| 4 | EC (Event Consequences) | This topic covers the results or effects of the event that resulted in the legal claim, including injuries, pain, medical treatment, lost income, and impact of the injury/accident on the person's life. |
| 5 | PPC (Prior Physical Condition) | This topic covers what the injured person could do before this injury happened. |
| 6 | TR (Treatments Received) | This topic covers all medical treatment received by the plaintiff for the injury. It includes EMT services, diagnostic testing, hospitalization, medications, surgeries, medical appliances, therapy, and counseling. |
| 7 | ER (Expert Elaboration) | This topic covers any detailed explanation by an expert witness. It usually involves the use of precise medical, engineering, vocation, or economic terminology, and may include detailed elaboration of the definition of terms. |
| 8 | IP (impact on Plaintiff) | This topic covers any description of the physical, mental, emotional, or financial impact of the injury on the plaintiff, including physical limitations, recovery progress, and any planned or potential future treatment. |
| 9 | DP (Deposition Procedures) | This topic covers the instructions that are often provided to deponents. |
| 10 | OPS (Operational procedures/ inspections/maintenance/repairs) | Most injury claims involve movable &cars, boats, etc) or immovable property (buildings, equipments, etc). This topic covers the condition, operational procedures, inspections, maintenance, or repairs of the property involved in the accident/event. |
| 11 | PRD (Plaintiff-related Details) | For face witnesses other than the plaintiff, this topic covers information gathered from them about the plaintiff. |
| 12 | O (Other) | This is to be used for any topic that the annotator believes is not covered in the list above. |

In some cases, as is illustrated in Table 12, a set of deponent (or answerer-type) roles can also be defined, along with a set of related aspect categories for the particular domain, topic, or field. The aspect classification component 130 can consider the deponent or answerer type and select the aspect category from that set (or favor selection of aspect categories from that answerer type). Questioner type categories can also be defined in association with aspect categories in further examples.

The segmentation component 132 can use sentence embedding based methods. The methods based on text and topic tiling use different representations for texts that can be subsequently used to compute the similarity between two sentences. These can use either bag-of-words or a topic

TABLE 12

Examples of Deponent Roles and Related Aspects

| Deponent Role | Definition | Related Aspects |
| --- | --- | --- |
| Plaintiff | This is generally the person who files the c ase against the defendant requesting damages for injury caused by the defendant in an event. | B, EB, ED, EC, PPC, TR, IP |
| Face Witness | This person is either a witness to the event or knows facts about when/where/how the accdient/ injury occureed. There is osmetimes an interaction invoved with the plaintiff, but it might not be in all cases. | B, EB, ED, EC, PRD |
| Expert Witness | This witness is brought in for their domain expertise pertaining to a case. Typically this includes medical, engineering, and other domain experts. | B, PPC, TR, EE, IP |
| Related Organization Witness | These witnesses are from an organization that also is involved in the casee. These could range from the defendant parties to organizations that were involved in the claim. | B, ED, IP, OPS, PRD |
| Defendant | This is the party that has been sued. It could be a person who is being sued, or this could be representative of the organization being sued. A witness from an organization has some background related ot he event. This background could range from inspection, maintenance, and upkeep of the real or personal property, to knowledge about past events that may be related to the event. | B, EB, ED |

The segmentation component 132 can organize sentences according to parts that have the same thematic context. The segmentation component 132 can segment a deposition into parts that have the same thematic context and topical coherence, which can add context to the generated summary sentences. The segments can include sentences that can be comprehended together as one unit and still convey the meaning of the whole block without any need of any surrounding context. Summary sentences that are generated as part of the summarization step can be augmented with sentences in such techniques, by running these methods on canonical or declarative sentences in the segments they are part of. These sentences augmented with context can be considered as a summary block that is thematically coherent. The summary blocks that are thus generated as part of the augmentation process can help in generating summaries that are particularly and densely informative.

The segmentation component 132 can use topic tiling, which can expand on the methodology employed in Text-Tiling. Instead of using a bag of words to represent a sentence, the Topic Tiling algorithm of the segmentation component 132 uses Topic IDs, which can be generated by the (latent Dirichlet allocation (LDA) inference method. This method can use a two step approach of training and testing. In the training step, a set of documents can be used as inputs to learn the topics using the LDA method. In the testing step, the words can be assigned topic IDs based on Bayesian inference. A word present in different sentences can be assigned different topics based on the sentence context. A sentence can be used as the smallest unit to be represented as a collection of topics. Subsequent sentences can be scored based on the cosine similarity of the respective sentence vector representations. These scores were used by a depth score method to identify the segment boundaries. In one example, a number of topics can be set as 100 as the fixed number of topics, and w=3 as the topic sequence size. However, other values can be selected.

representation for the text. The cosine similarity between the sentence embeddings can be used as a cohesion score between the two sentences. These embeddings can be used subsequently to compute similarities. The depth score method can be used on the cohesion scores to assign segment boundaries.

The deep learning based BERT system can be pre-trained on a large corpus for two separate tasks. One of these tasks can be the next sentence prediction task. The goal of this task can be to predict which sentence out of a choice of 4 (or any number) sentences was the most likely subsequent sentence. Applying such pre-training, the system assigns a probability to a set of sentences, which signifies whether sentences in a pair can be considered as adjacent sentences. The system can use the probability score as the cohesion score between sentences. The depth score method can be used on these scores to assign the segment boundaries.

In order to add domain adaptation to summarization, aspect categories can be defined for the domain, field, or topic of a document, which in one example can be a deposition. The aspects or aspect categories can help create a richer representation for a sentence since they can represent a sentence based on the aspects it contains. Similar to Topic Tiling, a word can be assigned to an aspect based on its most frequent occurrence in a given aspect.

A sentence can be represented as a combination of aspects, as a vector A, where |A| is the number of aspects. Table 13 displays example aspect annotation of QA pairs and machine generated declarative sentences (DS) from a plaintiff deposition. It also displays a sample segment annotation of the QA pairs, where at the end of each segment, 1 is in the adjacent segment cell of the last QA pair, that denotes the segment boundary as determined by the segmentation component 132. As part of pre-processing, the declarative sentences can be first tokenized into words, followed by removal of stop words, punctuation symbols, and digits, in order to remove noise from the sentences. The words remaining after pre-processing can be used to represent the respective sentences as a vector of different aspects.

As part of segmentation, to measure a coherence score of two adjacent sentences, a configurable variable block (w)

TABLE 13

An example of the segment annotation process

| Question | Answer | Declarative Sentence | Aspect | Segment |
|---|---|---|---|---|
| So when you were coming down the stairs, you said you were normal cadence walking down the stairs? | (Nodding) | when I were coming down the stairs, I said I were normal cadence walking down the stairs? | ED | |
| Leading with your right foot; correct? | Yeah. | with leading my right foot | ED | |
| Did you slip? | No, sir. | I did not slip. | ED | |
| Did anyone push you down the stairs? | No, sir. | not anyone push I down the stairs. | ED | |
| And there was you mentioned earlier there was a handrail on the other side of the wall; correct? | I aint really sure if it was that side or that side. I k now there was a main handrail there that was not giong nowhere that you, that's on the on the wall. I think it's I think it's on that side, thought. | i aint really sure if it was that side or tha side. i know there was a main handrail there that was not giong nowhere that I, that's on the on the wall. I think it's I think it's on that sides, thought. | ED | |
| Did you jump? | No. | i did not jump. | ED | 1 |
| Does anyone else have any information about how the hour your accident took place that evening? | No, but, I mean, the little bit that Miss NAME12 seen is all I know about the scene and everything. | not anyone know how the how my accident tok place that evening, but I mean the little bit that miss name12 seen is all I k now about the scene and everything. | ED | |
| Okay. I want to ask you a few questions about the condition that land handrail; okay? Did you notice anything about he condition of the handrail the week before? You said you go to Miss NAME12 house several times a week; correct? | Yeah. No, i ain't noticed anything. | i did not notive anything about the condition of the handrail the week before. i said i go to miss name12 house several times a week; i ain't notived anything. | EB | |
| The day before the accident, had you noticed anything about the handrail? | No, sir. | the day before the accident, i had not notived anything about he handrail. | EB | |
| And on your way upstairs, did you notice anything - | No, sir. | on the way upstais, i did not notice anything. | EB | 1 |
| All right, NAME14, when did you first seek medical treatment for the injury that you sustained? | Immediately. | i did first seek medical treatment for the injury that i sustained immediately. | EC | 1 |

Table 14 shows the declarative sentences along with their filtered tokens and vector representation. A training set can be created using the training data 157. All of the sentences in this training set can be assigned an aspect by a human annotator or by the system automatically. A dictionary of words can be created that associates each with a single aspect, as determined below. For a word, all of its occurrences can be arranged based on the aspect of the sentence in which it was present. A grouping can be performed based on each aspect and the score for a given aspect was the instance count from each time a word was detected in that aspect. Once the grouping is complete, the aspect with the maximum score can be assigned as the aspect for the word. This can be done for each word in the training set, barring the stop words.

can be introduced which specifies the number of sentences to either side of the point at which the system computes the coherence score. Using a block of k-sentences can add the surrounding context that can help generate a better coherence score. Each block can be represented as a vector of dimension |A|, with |A| being the number of aspects used, which in this case can be 12. To calculate the coherence score, the cosine similarity between two |A|-dimensional vectors can be identified. The coherence score of the whole document can be measured to find a depth score which is used to identify the segment boundaries.

TABLE 14

| Declarative Sentence (DS) | Tokenized and Filtered Declarative Sentence | \|A\|-dimensional Vector Representation |
|---|---|---|
| when I were coming down the stairs, I said I were normal cadence walking | "come", "stair", "said", "normal", | [0, 0, 0, 7, 0, 0, 0, 0, 0, 0, 0, 0] |

TABLE 14-continued

| Declarative Sentence (DS) | Tokenized and Filtered Declarative Sentence | \|A\|-dimensional Vector Representation |
|---|---|---|
| down the stairs? | "cadence" "walk", "stairs" | |
| with leading my right foot | "lead", 'right", "foot" | [0, 0, 0, 3, 0, 0, 0, 0, 0, 0, 0, 0] |
| i did not slip. | "did", "slip" | [0, 0, 0, 2, 0, 0, 0, 0, 0, 0, 0, 0] |
| anyone push did not i down the stairs. | "push", "did", "stairs" | [0, 0, 0, 2, 0, 0, 0, 0, 0, 0, 0, 0] |
| i ain't really sure if it was that side or that side. i know wthere was a main handrail there that was not going nowhere that I, that's on the - on the wall. ithink it's - i think it's on that side, though. | "at", "n't", "really", "sure", "know", "main", "handrail", "go", "wall", "think", "think" | [0, 0, 1, 11, 0, 0, 0, 0, 0, 0, 0, 0] |
| i did not jump. | "did", "jump" | [0, 0, 0, 2, 0, 0, 0, 0, 0, 0, 0, 0] |
| does not anyone else place took about how you how my accident took place that evening, but i mean the little bit that miss name12soon is all I know about the scene and everything. | "does", "plac e", "took", "accident", "took", "place", "evening", "mean", "little", "bit", "miss", "name12", "soon", "know", "scene" | [0, 0, 0, 15, 0, 0, 0, 0, 0, 0, 0, 0] |
| I want not to i ask a few questions about the condition of that handrail; okay. I did notive anything about the condition of the handrail the week before i said I go to miss name12's house several times a week; correct. I aint notived anything. | "want", "ask", "question", "condition", "handrail", "okay", "did", "notice", "condition", "handrail", "week", "i", "said", "miss", "name12", "#Z,899;", "time", "week", "correct", "at", "n's", "notive" | [0, 0, 20, 2, 0, 0, 0, 0, 0, 0, 0, 0] |
| the day before the accident, I had not notived anything about the handrail. | "day", "accident", "notive", "handrail" | [0, 0, 4, 0, 0, 0, 0, 0, 0, 0, 0, 0] |
| I notive did not my way upstairs, did i notice anything - | "notice", "did", "way", "upstairs", "did", "notice" | [0, 0, 5, 1, 0, 0, 0, 0, 0, 0, 0, 0] |
| I did first seek medical treatment for the injury that i sustained immediately. | "did", "seek", "medical", "treatment", "injury", "sustain", "immediately" | [0, 0, 0, 1, 6, 0, 0, 0, 0, 0, 0, 0] |

Table 14 shows output words derived from 11 sample declarative sentences after pre-processing. This illustrates how a sentence can be represented as an |A|-dimensional vector. For each sentence, the aspect for each word can be retrieved from the dictionary created from the training set. The value of the $a^{th}$ aspect can be incremented by 1 each time a word associated with that aspect was encountered. As shown in the table, vector representations of the sentences can be formed based on the aspect instance counts.

To expand upon the example in Table 14, depth scores can be calculated for the vector representations using order=2. This is an example window size for comparison of a given cosine similarity score with its neighboring scores. In this case, the cosine similarity score is compared against the two left and right neighboring scores to compute the final depth scores. Ten cosine similarity values can be identified as shown in Table 15 for the 11 vector representations as part of the example that is being explained here.

TABLE 15

| Cosine Similarities | 0.38 | 0.55 | 0.17 | 0.08 | 0.12 | 0.15 | 0.05 | 0.05 | 0.00 | 0.76 |
|---|---|---|---|---|---|---|---|---|---|---|

After computing the depth scores and identifying the segment boundaries, Table 16 depicts the generated segments head-to-head with the reference segments. For this example, the generated segments attained a WindowDiff score of 0.2.

TABLE 16

| Sentence # | 1 | 2 | 3 | 4 | 5 | 6 | 7 | 8 | 9 | 10 | 11 |
|---|---|---|---|---|---|---|---|---|---|---|---|
| Reference Segments | 0 | 0 | 0 | 0 | 0 | 1 | 0 | 0 | 0 | 1 | 1 |
| Generated Segments | 0 | 0 | 0 | 0 | 0 | 1 | 0 | 0 | 0 | 0 | 0 |

Since the segmentation component 132 can use multiple different methods as discussed above, a single method, or an ensemble based approach, can be used for detecting and defining segment boundaries. The individual segment boundaries from each of the methods can be identified, and the segmentation component 132 can then use a voting scheme to assign a segment boundary. For example, a majority or other vote count of a predetermined threshold vote count (e.g., 2 or greater) can be used to assign a boundary.

The summarizing component 134 can use multiple summarization methods on sentences grouped by aspects to generate or identify candidate summary sentences. These summary candidates can be augmented with sentences from the segment they were a part of. A voting-based scheme can rank the summary candidates, and the top summary candidates can be used to generate a final summary.

Summarizing a deposition can be approached in a topic or domain-specific manner. For example, legal summarization can be different from summarization methods to summarize news articles, as a deposition is different from a news article. A news article has a central event or a story that is the main focus of the article. Everything in the news article centers around the given event or story. The summarization systems for news articles identify the central event and then focus on adding surrounding context to this event, resulting in a shorter narrative which is considered the final summary.

Another requirement stems from the needs of the end-users. They can be interested in a certain aspect or set of aspects of the deposition instead of one single generic summary. These aspects of interest can range from events that preceded the actual event, to the consequences of the event on the plaintiff or property. A litigation matter can involve more than the defendant or the plaintiff. Summarizing a deposition for deponent types such as fact or expert witnesses can require a different technique as opposed to those suitable for the defendant or the plaintiff. The aspects of interest can vary for each deponent type, based on what information they add to the case. These aspects can be classified based on a topic or domain-specific ontology, such as that described for the aspect classification component 130. An example of domain-specific aspect categories is found in Table 11. An example listing of aspects related to different deponent types is found in Table 12.

Having a summarization method that would provide the end-user the ability to customize the summary generation would be useful. One of the customizations could be a feature to select the aspects that have to be covered in the summary. A simple way to solve this problem is to define a template that lists the aspects of interest for the different deponent types. Summaries could be generated using such a template. This however does not address the goal of generalization for the summarization system. Multiple depositions for the same deponent type could also vary in the aspects that are present in the deposition. For example, a fact witness deposition could contain facts about the event itself when the witness was present during the actual event or accident. However, a fact-witness who was not present during the event but is deposed to elaborate on the plaintiff's current condition might have information about the impact of the accident on the plaintiff.

To be able to generalize well, the summarization service 120 can orchestrate the internal methods to identify the aspects of interest for a deponent type based on the distribution of aspects present in the deposition. From a compression perspective, the summarization service 120 can also be able to define the compression ratio individually for each aspect, which can be automatically modified based on the actual distribution of the aspect present in the deposition. The identified candidate summary sentences can be augmented with context such as words, titles, labels, phrases, or sentences as generated by the segmentation component 132.

The summarizing component 134 can generate extractive summaries for the depositions or any type of document data 150. The candidate sentences in the depositions can be annotated for inclusion. These annotations can be visualized in a user interface to highlight the important parts of the deposition as indicated by the summary candidates.

One type of summarization used by the summarizing component 134 is aspect based summarization. As part of this method, the summarizing component 134 groups the transformed declarative statements based on their aspects and uses three (or another number) baseline methods to summarize the sentences for each aspect individually. A configuration file can be used to manage the custom compression ratio for each aspect. The summarization methods use this compression ratio to create a summary for each aspect. The summarizing component 134 defines different configuration files for each deponent type. Once the candidate summary candidates are identified, each such candidate can be augmented by the segment sentences the candidate was part of.

Summarizing component 134 uses additional techniques as part of the aspect based summarization. Guided aspect summarization is one such technique. A threshold level number or percentage of non-relevant sentences can be identified from a particular aspect or aspects, such as in this example, 1 (Bio) and 12 (Other). These can be considered underrepresented aspect categories or aspects. These sentences did not have much resemblance to the included sentences from other aspects. Also, there can be sentences from these aspects that were marked as important in the annotated ground truth. In some cases, the sentences from these two aspects were the most prevalent in any deposition. Based on this analysis, the system does not simply omit the sentences from these aspects. Rather, the summarizing component 134 uses the following heuristics to decide what sentences from these aspects to include as candidate sentences.

The summarizing component 134 uses a method that leverages the included candidate summary sentences from the other aspects. In this way, sentences from other aspects can assist in relevant sentence selection from the underrepresented aspects. The summarization method can then be divided into two steps. For each of the summarization methods out of TextRank, LexRank, or BERT, the summarizing component 134 summarized the sentences from all the aspects except under-represented aspects 1 and 12. Once all of the candidate summary sentences from other aspects were identified, we used all of those as a single set to find the relevant sentences from the remaining two aspects.

The summarizing component 134 can use a (Kullback-Leibler) KL-divergence based method to calculate the divergence between the candidate sentences and the sentences from under-represented aspects 1 and 12. The top-n % threshold percentage of the sentences ordered by least divergence can be selected for each aspect individually and added to the candidate list. The value n can be defined in the configuration file and can vary based on, or be defined specific to, each deponent type. Once the final list of candidate sentences is identified, these can be augmented with additional sentences from the segments to help provide context.

The summarizing component 134 can use a different configuration file for each deponent type to define a compression ratio for that aspect. An example of such a configuration file is shown in Table 17.

TABLE 17

{
"1": 0.08
"2": 0.1
"3": 0.1
"4": 0.1
"5": 0.0
"6": 0.1
"7": 0.1
"8": 0.1
"9": 0.2
"10": 0.0
"11": 0.04
"12": 0.1
}

These compression ratios can also be considered the relative priority of an aspect, as compared to the other aspects.

Aspects can be distributed differently in terms of percentages even for the same deponent type. For example, sentences from the aspect "Event Background" can include about 30% of the sentences in one deposition, whereas the same aspect might only comprise 10% of the sentences in another deposition, though the deponent type is the same in both cases. The distribution of the aspect sentences in a deposition conveys what was discussed at a high-level during the deposition. The summarizing component 134 can use this information to modify aspect compression ratios. Multiple tiers can be defined for distribution levels. For example, a 3-tier example can be defined as high, medium, and low for the different distribution types. The compression ratios can also be defined in 3 tiers of high, medium, and low.

The summarizing component 134 can use a multiplier on the aspect compression ratios based on the actual distribution of the aspect in the deposition. This multiplier was termed as the coverage multiplier since it bumps up the coverage based on the actual distribution of the aspect. Rules can be applied, based on the mix of the compression ratio and the distribution, and based on their respective tiers. The final compression ratio for each aspect was modified this way and was used for the summarization.

Table 18 shows tiers for the different compression ratios based on their values defined in the configuration file. These ratios are used to define the compression ratio for a given aspect. A value of 1 signifies no compression. Table 19 shows tiers for the different distribution tiers based on the observed distribution in a deposition.

TABLE 18

| Tier | Compression Ratio |
| --- | --- |
| Low | 0.2 or less |
| Medium | 0.2-0.5 |
| High | 0.5 or greater |

TABLE 19

| Tier | Distribution (%) |
| --- | --- |
| Low | less than 5 |
| Medium | 5-10 |
| High | greater than 10 |

Table 20 shows rules for the coverage modification based on observed aspect distribution. "Original Value" refers to the value present in the configuration file.

TABLE 20

| | Coverage Distribution | | |
| --- | --- | --- | --- |
| Compression Ratio | Low | Medium | High |
| Low | 2 × original Value | Set to 0.1 | Set to 0.1 |
| Medium | 1.5 × Original value | 0.5 × Original value | 0.5 × Original value |
| High | Set to 0.9 | Set to 0.8 | Original value |

The summarizing component 134 can also include the ability to increase or decrease the size of the summary generated. For example, a user interface can allow a user to modify a size parameter so the summarizing component 134 can generate summaries with different compression ratios through our methods. A float variable named as compression modifier can be modified through a user interface element, such as a selector, slider, text entry, configuration file modification, or another method. Changing the compression modifier can increase or decrease the size of the generated summary. The final compression ratio can be multiplied by the compression modifier to increase or decrease the size of the summary. This method can ensure that the original relative priority between the aspects is maintained since the compression modifier was applied to each aspect's compression ratio. The user interface can also enable a user to modify the aspect-specific compression ratios in a similar manner.

The summarizing component 134 can also user KL-divergence based summarization to identify aspect sentences and summarize them. A collection of sentences, for example, a training set of 9000 sentences, can have the aspects already annotated. These sentences can be grouped based on their aspects. The sentences in the depositions can also be grouped by aspect, and summarizing component 134 can use this as the target distribution to filter on. For each sentence in the deposition, summarizing component 134 can calculate the KL-divergence with the source distribution. After this computation, the deposition sentences can be ranked according to their values in increasing order. The top-n % of sentences can be selected from this ranked list where n was the desired compression ratio for each aspect as defined in the configuration. These sentences are not augmented with context in the initial experiments to prevent noise introduction into the final summary. This method does not use the segment context, since the candidate sentences selected by the KL-divergence method can be relatively more scattered across the deposition QA pairs or sentences as compared to the other methods, since summary candidates are based on the KL-divergence of the vocabulary distribution, which does not factor in a central concept of a summary that the other methods do.

The summarizing component 134 can also use candidate sentence augmentation in some cases. For a given sentence, summarizing component 134 can perform a lookup in the original document and identified the segment it was part of. All of the sentences from this segment can be added to the candidates list to be included in the summary. This technique can ensure that no sentence is present in the summary in isolation without any context. To keep track of the final summary candidates, summarizing component 134 can annotate each sentence or QA pair in the input file with additional metadata. Two Boolean metadata fields can be added for each summarization method. The first field can be an indicator of whether the sentence was selected originally by the summarization method. The second field indicates whether the sentence was included as part of the augmentation mechanism.

The summarizing component 134 can then perform final candidate selection. The summarization methods described can annotate each sentence (or QA pair) in the deposition as Boolean fields, where a 1 indicates inclusion and a 0 indicates exclusion. The summarizing component 134 can select candidates that were annotated for inclusion by multiple methods. For further filtering, a voting based mechanism can be used to select the final candidate sentences that are used to generate the final summary. The summarizing component 134 can use both of the summary methods and augmentation indicators to calculate the final vote. All of the finally selected declarative sentences can be concatenated to form a narrative summary. For an extractive summary, each sentence can be annotated for inclusion using an additional Boolean metadata field.

A summary generated and stored as summary data 155 can include sections or paragraphs, e.g., with each paragraph having sentences of one single aspect. Sentences from each aspect can be grouped together. The summarization compression ratio can be customized for each aspect. The compression ratio for each aspect can be learned from existing summaries. This approach can be used to compute the default compression ratio values for generating a summary in experiments. A user can tune these ratios as per their requirements.

Multiple abstractive and/or extractive summarization methods can be used to generate candidate summary sentences, as would be familiar to one skilled in the art. Each sentence was scored based on the type and number of instances in which it was identified as a candidate summary sentence.

Sentences from pleadings associated with a deposition were used as query sentences to match against the document sentences. A BERT based question-answering system can be used for this purpose. Each sentence in the pleading was used as a query and the whole document was queried to find the result for this query. Each sentence retrieved using this method can be scored.

Once the list of candidate sentences is identified, these sentences can be ranked using the scores obtained as per the previous three paragraphs. The top-n % sentences can be used as the final list of candidate summary sentences. The parameter n was based on the compression ratio as chosen by the user. This parameter varied for each aspect. One skilled in the art would know of other ways to achieve a desired compression ratio, such as based on the number of characters or words in the original document and in the generated summary.

Once the candidate summary sentences are finalized, each sentence can be augmented with context to make the summary informative. One of the methods to add context to a candidate summary sentence is to identify the segment it belongs to. The whole segment can be used as a candidate summary segment that was summarized again by extractive or abstractive summarization methods to compress it further. This way a summary can be composed of compressed segments that contain the whole context.

A summary layout can be defined in terms of the aspects and the type of deponent (e.g., plaintiff, defendant, witness, or expert). A summary can vary based on the document type and may not contain sentences for all aspects. Such layouts based on aspects and document type can be learned from existing summaries.

Another facet of summary generation based on aspects is the coverage for each aspect. Different document types may require different coverage of each aspect, such as according to the importance of the various aspects in that type of document. The coverage of an aspect in a summary can also be learned from existing summaries.

The layout and the coverage information can be stored as part of a configuration for the system. During the generation of the summary, a configuration file can be passed to the summarization service 120 that has the details of the layout and the coverage of each aspect. This configuration can be used as a default to start with. A summary can be generated based on these defaults which can later be tuned further by an end user based on their preferences. The system can maintain multiple such default configurations based on the document and end-user type.

A summary as defined previously as a collection of different aspects can also be generated in an alternative way. Techniques like KL-divergence and Jenson-Shannon divergence are statistical measures to find the difference or divergence between two distributions.

Using an existing collection of sentences for each aspect, sentences from a given document can be extracted and ranked based on their overall KL-divergence with the whole collection. These extracted sentences were ranked based on their divergence. The top-n % of the sentences can be selected as candidate summary sentences.

The named entity recognition (NER) component 136 can identify named entities and then classify them into predefined classes. This can also be used to identify the deponent role, for example, for aspect categorization and segmentation. Deposition documents contain vital information about particular events, persons, locations, and other relevant information about a particular case. Hence, extracting such events and named entities would help in extracting relevant and essential details in a deposition and, in turn, help in generating summaries.

The named entity recognition component 136 can use the DyGIE++ framework to extract named entities, relations, and events from the declarative sentences. For example, the named entity recognition component 136 can feed a number of declarative sentences to a BERT or other language model, perform span enumeration, and graph propagation. The span enumeration can include enumerating text spans and building a dynamic graph with text spans and their coreference spans as nodes, and relations between them as edges. The model then performs multi-task classification to score the re-contextualized representations and make predictions for the particular end task.

A set of training data 157 can be obtained from domains like news and online forums, and has annotations for entities, relations, and events. As a result, this data can be downloaded or otherwise identified from a network source and used by the named entity recognition component 136 for training data 157. The types of entities extracted can include a domain-specific set of entities or a general purpose set of entities. For example, the entities can include:

PER: Person Entity (and coreferences)
LOC: Location Entity
ORG: Organization Entity
VEH: Vehicle Entity
GPE: Geopolitical Entity
FAC: Facility
WEA: Weapon Entity Events can be specific occurrences between two entities. A DyDIE++ generated output can include training with the event portion of the 2005 Automatic Content Extraction (ACE05) dataset. The output gives text spans for each corresponding named entity class, the relations between these text spans, and predicted events for the text spans. The named entity recognition component 136 can combine the outputs generated using the Automatic Content Extraction (ACE) relation and ACE event dataset based on softmax scores. The named entity recognition component 136 can perform post-processing to convert the JSON output to CSV format that we can use for further modification in some examples.

A keyword recognition component 138 can recognize keywords from declarative sentences of the reformatted documents 151 or intermediate data. Keywords or key phrases can be a set of important words that have the ability to summarize a given sentence or a text. Certain keywords may occur multiple times, or frequently occur with other phrases, and so might be necessary for a particular event from the case discussed in a deposition. Such phrases should be included as a part of the final summary. The keyword recognition component 138 uses a few methods to extract the keywords and key phrases from the declarative sentences from the deposition documents.

RAKE or Rapid Automatic Keyword Extraction is a domain-independent, effective, and efficient tool for extracting keywords from a given text or document. RAKE uses the fact that keywords often have multiple words but rarely contain stop words, punctuation, or other words with minimal lexical meaning. Relevant words often carry meaning within the context of a given document and are referred to as content words. Key phrases are also considered as keywords in this method.

RAKE first splits the input text into an array of words by a specified word delimiters list. This array is further split into series of contiguous words at phrase delimiters and stop word positions. Words within a sequence are given the same relative positions as in the text, or are considered a single entity and together are considered as a candidate keyword.

RAKE uses three metrics for calculating word scores: word degree, word frequency, and ratio of degree to frequency. Word frequency favors words that occur more often, and word degree favors words that occur more often and in candidate keywords that are longer. A co-occurrence graph of the candidate keywords is constructed, and the top T words are selected as keywords for the document.

The candidate keywords are scored based on each of the three metrics as degree over frequency scores for each candidate keyword. For instance, the score for the first keyword "minimal generating sets" is computed by adding the scores for corresponding words "minimal", "generating", and "sets" from the co-occurrence graph. The keyword recognition component 138 can use RAKE to extract the keywords and their corresponding scores from declarative sentences.

The keyword recognition component 138 can use the important and relevant keywords extracted to rank the declarative sentences. The keyword recognition component 138 can use Maximum Marginal Relevance (MMR) for ranking. MMR is a classical method to help in summarization, able to construct non-redundant and relevant single-document as well as multi-document summaries.

The keyword recognition component 138 can construct a query by concatenating the best extracted keywords. So that the query is not too long, the keyword recognition component 138 can identify an upper bound for the query length, based on empirical observation. Since depositions vary widely in length, and since longer queries are appropriate for longer depositions, the keyword recognition component 138 can use the total character count in the deposition to compute the upper bound on the query length. For example, max_query_length=total_character_count*0.005.

The MMR criterion tries to reduce redundancy and maintain query relevance in re-ranking the documents, or in our case, declarative sentences. It helps in selecting appropriate text or sentences in text summarization.

The high-level overview of keyword recognition component 138 using MMR can include loading document data 150, performing keyword extraction using a keyword extraction algorithm or method like RAKE, scoring the sentences based on keyword statistics, and re-ranking the sentences using MMR. The summary of a deposition should be concise and should not have redundant sentences included in it. The keyword recognition component 138 can use TF-IDF scores for each sentence. Then cosine similarity is used to calculate the similarity between two candidate sentences, and between the query and the candidate sentence; these help to remove the redundancy. If the similarity score between two candidate sentences is high, then the sentence which is more relevant to the query is ranked higher, and the other sentence is given a very low score. In this way, the keyword recognition component 138 can construct a smaller set of candidate summary sentences, with less redundancy. The MMR formula is given as equation 1. In our case, the variables in the equation denote the following.

$$MMR \stackrel{def}{=} \underset{D_i \in R/S}{\text{Arg max}} \left[ \lambda \left( Sim_1(D_i, Q) - (1-\lambda) \underset{D_j \in S}{\max} Sim_2(D_i, D_j) \right) \right] \quad (1)$$

Q=Query, that the keyword recognition component 138 can construct using the extracted keywords. D=Set of sentences in the deposition. S=Subset of sentences in R already selected. The algorithm iteratively compares each candidate sentence with the query, and adds the sentence to R based on the similarity score. It also computes the similarity between the sentence and other sentences in R; if two sentences have a high similarity score, the sentence most similar to the query is selected and the other sentence is discarded. R/S=Set of unselected sentences in R. λ=Constant used for diversifying the results, in range [0-1]. When λ is high, the candidate sentences are similar to the query, but when λ is small, the candidate sentences are very dissimilar relative to each other.

As per the MMR criterion, the algorithm incrementally retrieves the standard-relevance list (sentences more similar to query) when λ=0 or a maximal diversity list (sentences more diverse or dissimilar to other candidate summary sentences) when λ=1. Since we need a combination of both, we set the value of λ toward the middle of the range of 0 to 1. We use a λ value of 0.5 to optimize both the criterion. Accordingly, we get a diverse and relevant list of candidate sentences that we can use for summary generation. Using an optimized value of λ, WAR ranking allows minimizing redundancy and leads to query-relevant summarization.

The computing environment 103 can store document data 150, reformatted documents 151, mapping data 153, summary data 155, training data 157, model data 159, intermediate data, and datasets 161, as well as other types, categories, or partitions of data in one or more data store 141. In some examples, the training data 157 can include training datasets 161, and verification data can include verification datasets 161.

Figure 5:
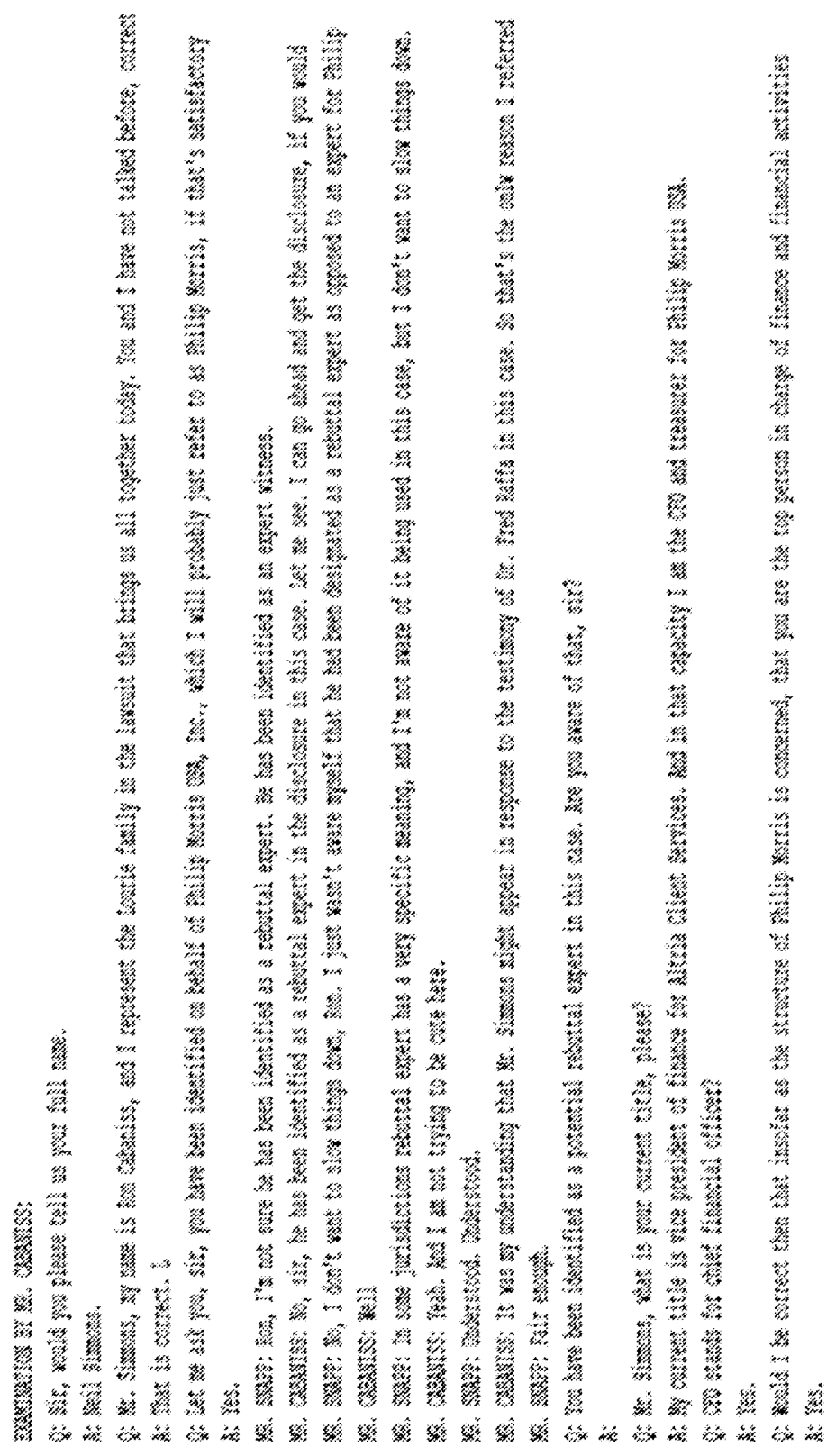

The summary data 155 can include summary documents in a particular readable format, which can include a format represented in a user interface generated by the summarization service 120 for viewing. The reformatted documents 151 can include text-based files that are reformatted versions of the documents 150. The reformatted documents 151 can include JSON-based and other question-answer formatted files as shown in FIGS. 5-7.

The document data 150 can store question-answer documents for processing by the summarization service 120, as well as declarative segment documents that result from processing by the summarization service 120. The mapping data 153 can store various mappings between different sets of data, such as a mapping between non-anonymized data and the anonymized representation of that data. The model data 159 can store various models used by the summarization service 120 to process question-answer documents, such as classifiers for classifying question-answer groups based on dialog act, models used for recognizing named entities in question-answer groups for anonymization, and models for transforming classified question-answer groups into declarative segments. The training data 157 can include data that can be used to train models such as those stored in the model data 159. The intermediate data can store intermediate representations of text included in a question-answer document between various stages of processing by the summarization service 120. Each of the document data 150, mapping data 153, model data 159, training data 157, and intermediate data, however, can store any other data as appropriate.

The datasets 161 can include validation datasets and information used to validate results of various processes described herein. For example, the datasets 161 can include a dataset of legal depositions. Classification experiments can be performed on this dataset and results are described below. The example legal deposition dataset comprises around 350 depositions. The format of these documents follows conventional legal deposition standards.

As another example, the datasets 161 can include a public dataset retrieved from a network location. The public dataset can include legal documents related to the settlement of court cases between US states and the seven major tobacco industry organizations, on willful actions of tobacco companies to sell tobacco products despite their knowledge of the harmful effects. It was launched in 2002 by the UCSF Library and Center for Knowledge Management to provide public access to the many legal documents related to that settlement. The dataset, available for download, continues to grow as litigation continues. Among the over 14 million available documents, there were over 20,000 deposition related documents including transcripts, exhibits, telephone records, etc. Some 2,000 of these are witness deposition transcripts. The depositions from this dataset in general were longer than in the legal deposition dataset.

The network 115 can include the Internet, intranets, extranets, wide area networks (WANs), local area networks (LANs), wired networks, wireless networks, cable networks, satellite networks, other suitable networks, or any combinations thereof. The computing environment 103 can communicate with other devices coupled to the network 115 using various data transfer protocols and systems interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof. The network 115 can include connections to any number and type of network hosts or devices, such as website servers, file servers, cloud computing resources, databases, data stores, or any other network or computing architectures.

The client device 109 is representative of one or more client devices. The client device 109 can be embodied as any computing device, processing circuit, or processor based device or system, including those embodied in the form of a desktop computer, a laptop computer, a personal digital assistant, a wearable computing device, a cellular telephone, a tablet computer, an augmented reality device, or a virtual reality device, among other example computing devices and systems. The client device 109 can include one or more subsystems and/or peripheral devices. For example, the peripheral devices may include one or more input devices, such as a keyboard, keypad, touch pad, touch screen, microphone, scanner, mouse, joystick, camera, one or more buttons, etc. The peripheral devices may also include a display, indicator lights, speakers, global navigation satellite system (GNSS) circuitry, accelerometer, or other components, depending upon the primary use of the client device 109.

The client device 109 can include a client data store 185 that stores one or more executable applications such as the client application 180, a browser application, an operating system, and other programs. In some examples, the client application 180 can access one or more question-answer documents from the client data store 185. These question-answer documents can be transmitted to the client device 109 via the network 115 or generated by the client application 180 and stored in the client data store 185. In some examples, a question-answer document can be generated by the client application 180 based on input from one or more input devices (not shown) communicably coupled to the client device 109. The client application 180 can access one or more question-answer documents from the client data store 185 and transfer the one or more question-answer documents to the computing environment 103 for processing. In some examples, the client application 180 can include a browser application that accesses a user interface generated by the summarization service 120, such as a website or web application user interface. In some cases, the client application 180 can perform all of the functionalities discussed with respect to the summarization service using the client device 109.

FIG. 2 shows an example document 203 from the document data 150. The document 203 can be a legal deposition, or another type of document in a single page layout. That document text can include questions and answers. While digitizing such documents that are available on paper, personnel or sources of document data 150 can use different layouts while scanning or generating the original documents. Sometimes a document 203, such as that shown in FIG. 2, is scanned in a single page layout as shown.

Figure 3:
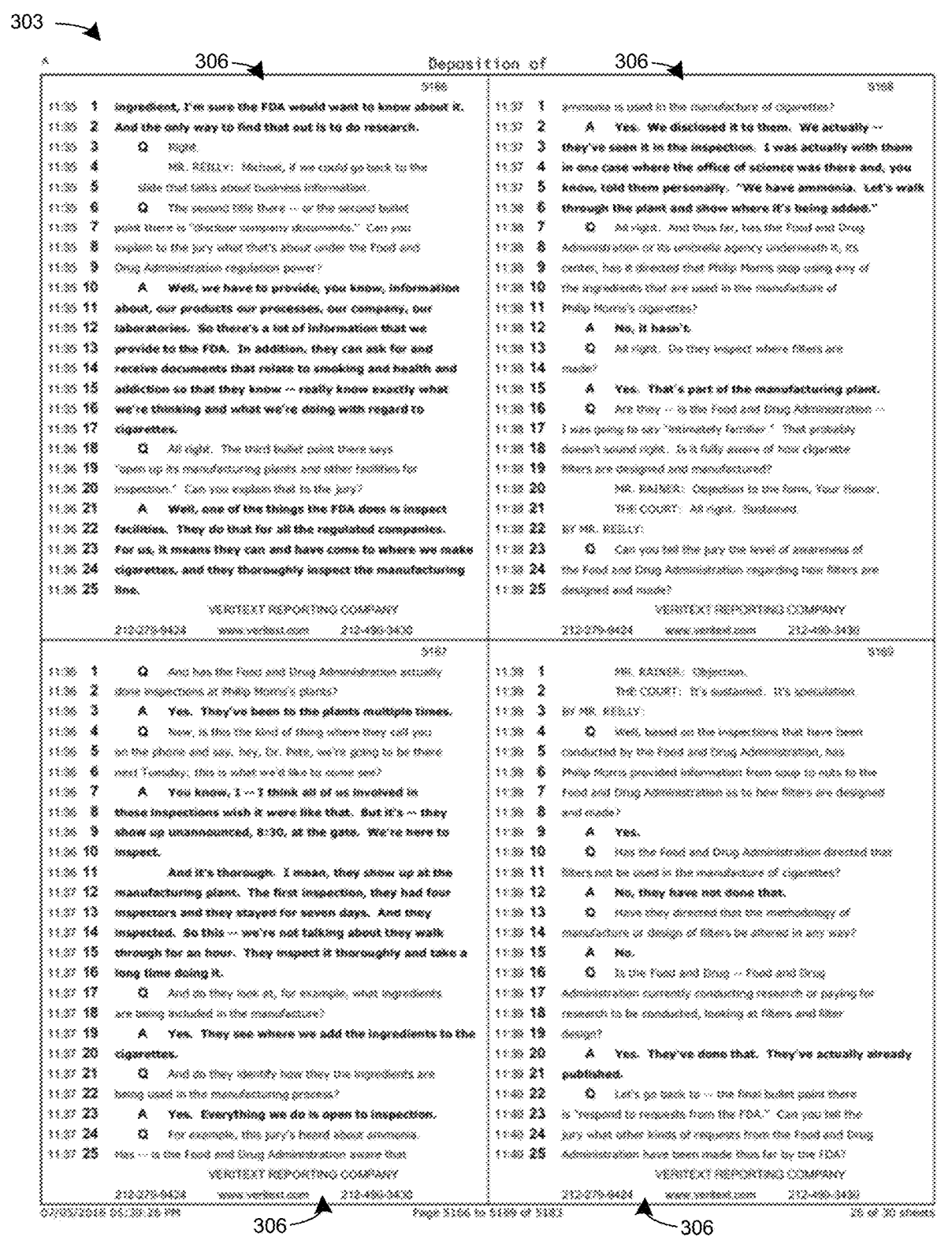

FIG. 3 shows an example document 303 from the document data 150. The document 203 can be a legal deposition, or another type of document scanned or generated as one page in a 2×2 grid with bounding boxes 306. A generalized technique can be used so that it is easy for computers to read documents of such types that have been scanned as an image with different layouts in a generalized way.

Figure 4:
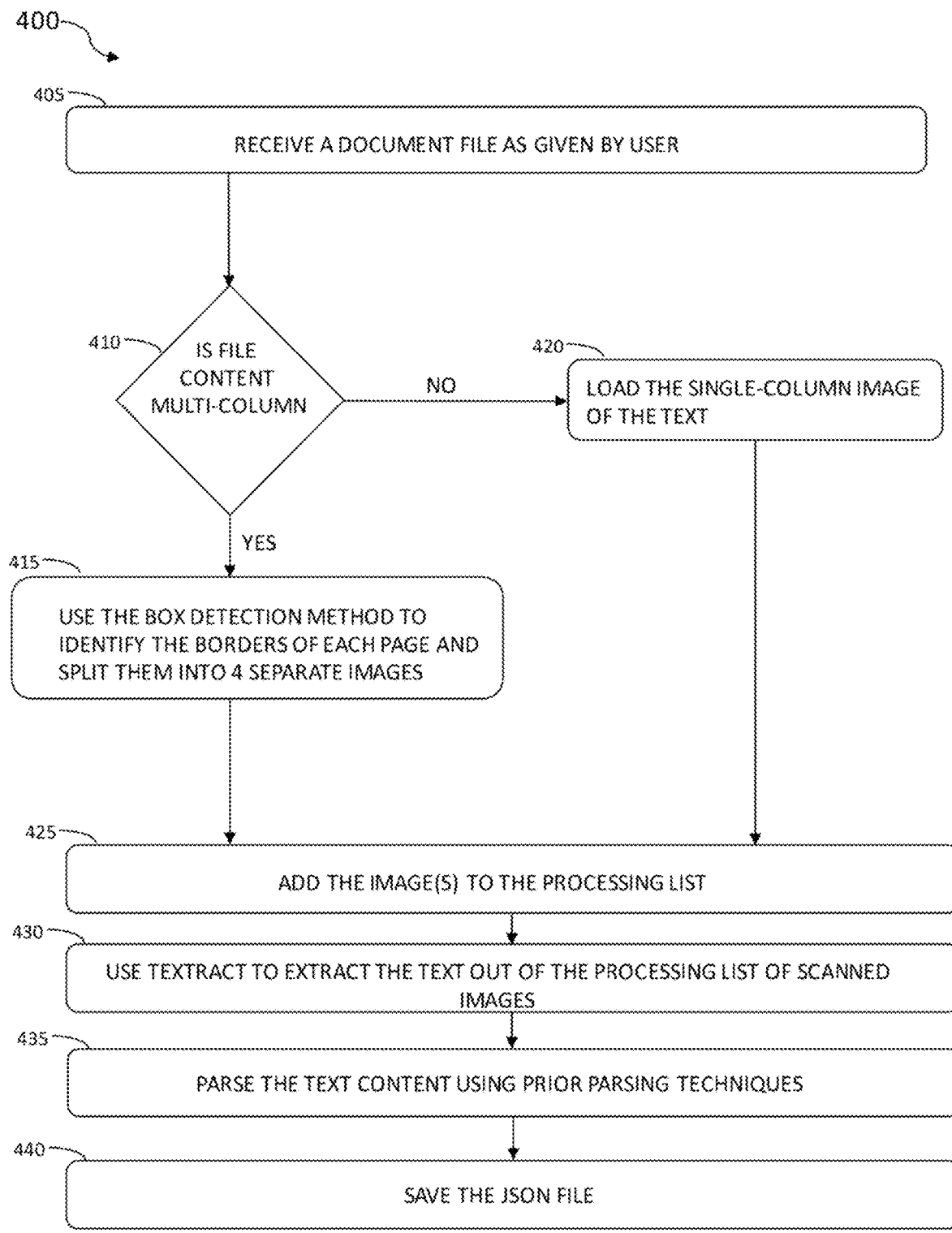
FIG. 4 shows a flowchart that provides one example of an operation of components of the networked environment to parse content of a file into question-answer groups, according to various embodiments of the present disclosure.

FIG. 4 shows a flowchart 400 that provides one example of an operation of a portion of the parsing component 122 for parsing content of a file into question-answer groups. While the steps are described as performed by a certain component of the summarization service 120, certain functionalities can be performed by other components of the summarization service 120 and other components of the networked environment 100. Steps are provided for example purposes, and can be performed sequentially, concurrently, with partial concurrence, and scrambled relative to the shown order.

In step 405, a document is received, for example, loaded to a client device 109, uploaded from the client device 109 to the summarization service 120, or otherwise transferred to the datastore 141. The parsing component 122 can identify and access the document in the document data 150. In some examples, a PDF file can contain images in the pages. Pdf2image is a library that can process an individual page of a PDF file and convert it into a PNG format. The individual pages can be converted into a list of PNG files so that they can be processed further.

In step 410, the parsing component 122 can determine if the file content is multi-column. If the content is multi-column or multi-page (multiple pages shrunk onto one condensed page), then the process can move to step 415. For single column or single page content, the process can move to step 420. The parsing component 122 can identify bounding boxes 306 in the document, and if the bounding boxes 306 indicate a number of page columns and page rows, in the case of document 303, there can be 2-page columns and 2-page rows, or a 2×2 layout of pages. In the case of the document 203, a bounding box can also be identified, but there can be a single page identified.

In step 415, the parsing component 122 can use a box detection method to identify the borders of each page, and split them into four separate images, which are then loaded. If the scanned document is in a four-page grid layout, the parsing component 122 can use a box-detection technique 415 to identify the borders of each page and extract an image for each. These images need to be individually processed as described in the previous step. FIG. 3 shows a deposition document in a four-page grid layout (multi-page format). The single page layout is surrounded by 4 lines, one on each side. The four-page layout has 4 lines around each page.

The parsing component 122 can also include, reference, access, and otherwise use OpenCV library. The OpenCV library can handle the extraction of the individual page image that is present in bounding boxes. This library can be used to extract the individual page images for a four-page 2×2 layout. To process the four-page layout, the content of the individual pages needs to be detected within their surrounding lines or boxes. Using the cv2 part of the OpenCV library, kernels can be defined that can identify vertical and horizontal lines.

In step 420, if the scanned document is in a single page layout, the parsing component 122 can load the single column or single page image of the text.

In step 425, the parsing component 122 can add the images to a processing list. For example, if multiple pages are identified, the multi-page format can be separated, and four images can be added to an image processing list per page. Otherwise, a single page can be loaded for each page if the pages are single column or single page images.

In step 430, the parsing component 122 can read the data using Textract® or another OCR service or method, such as through a service provided by Amazon® Web Services (AWS), or executed by the computing environment 103. In the case of a network or cloud-based service, a cloud-based service can read an image with text content and extract the text from it. The text output after the extraction can be saved into another file. FIG. 2 shows a deposition document in a single page layout. The individual images can be uploaded to the AWS S3 storage service and the Textract service processes the files in the storage location and returns the text contained in images. Once the individual boxes are identified, a contour detection technique can be used to find the boxes in a sorted order. Once all the contours are detected, the image content from each contour is cropped and saved as individual images. The bounding lines are cropped out of the content.

In step 435, the parsing component 122 can parse the text content. This can include extracting the raw text content of the deposition.

FIG. 5 shows an example of a page of a deposition transcript that after parsing can yield question-answer groups and then a question-answer data structure.

Referring back to FIG. 4, the parsing component 122 can then process the text further to be made readable in a programmatical way that adheres to a given structure. For example, the question and answers can be identified in the raw text.

In step 440, the parsing component 122 can convert the parsed text into a JSON format.

FIG. 6 shows an example of the resulting JSON structure for the document.

Referring back to FIG. 4, the parsing component 122 can also parse the text as described in U.S. Provisional Patent Application Ser. No. 62/945,202 and U.S. patent application Ser. No. 17/113,880, to convert it into a JSON format. This file is saved for further processing in the pipeline. The text content in the original document also contains the page and line numbers. Parsing the page and line numbers of each line of text would be useful for future traceability to the original source document. Regular expression (regex) based methods were used to extract the page and line numbers.

FIG. 7 shows the format of the JSON document that captures the page and line numbers for the questions and answers in a question-answer data structure generated from question-answer groups parsed from an examination portion of a deposition transcript.

Figure 8:
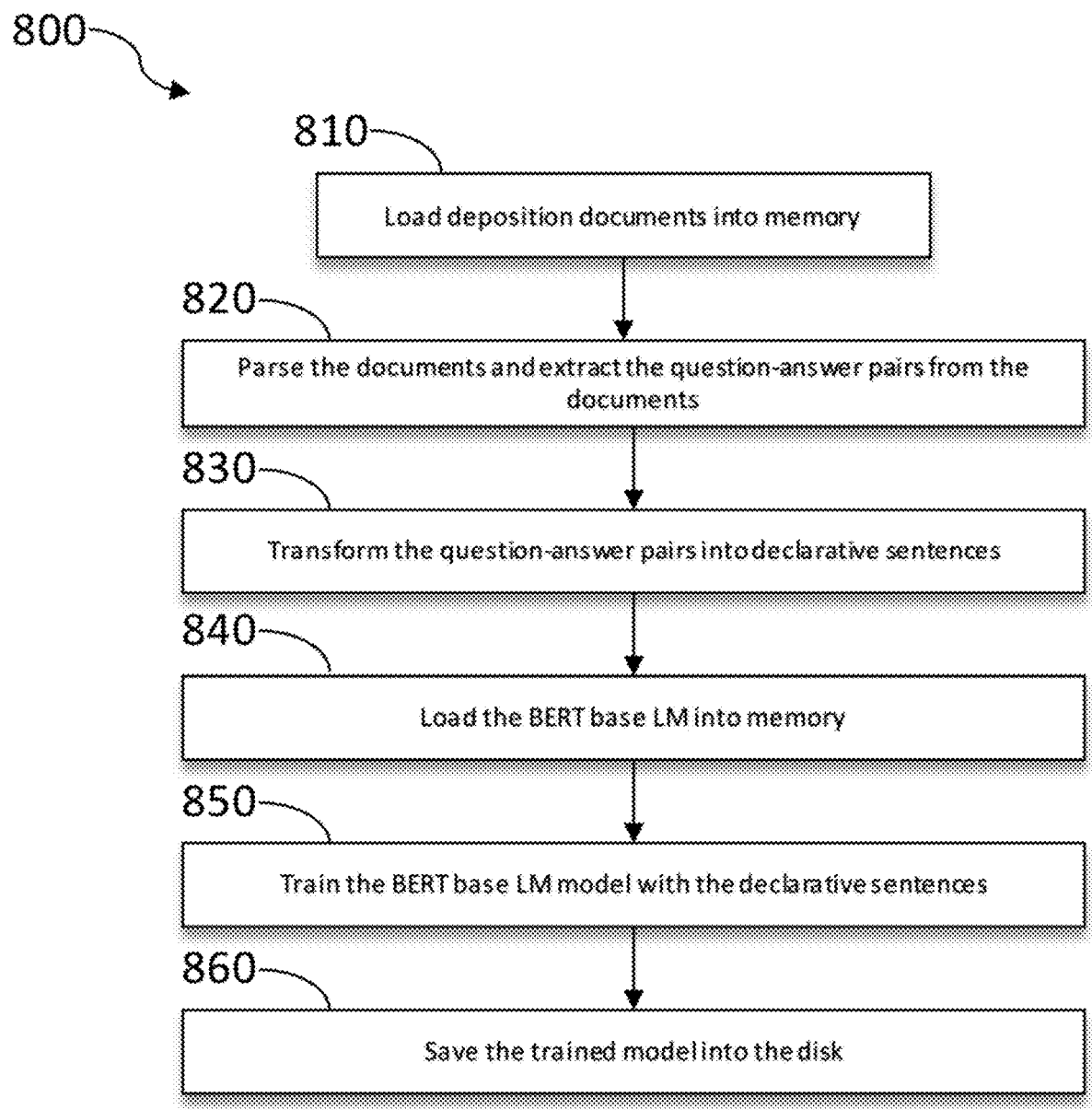
FIG. 8 shows a flowchart that provides one example of the operation of components of the networked environment for model training, according to various embodiments of the present disclosure.

FIG. 8 shows a flowchart 800 that provides one example of the operation of components of the networked environment 100 for model training. While the steps are described as performed by the summarization service 120, certain functionalities can be performed by particular components of the summarization service 120 and other components of the networked environment 100. Steps are provided for example purposes, and can be performed sequentially, concurrently, with partial concurrence, and scrambled relative to the shown order. Improvements to the aspect classification can result from using a trained model, as is explained below. The aspect classification can be custom trained to align to the legal domain.

In step 810, the summarization service 120 can load deposition documents into memory. For example, a client device 109 can provide documents as document data 150, which can be transmitted over a network from the client device 109 to the summarization service 120. In other cases, a user can access a user interface of the summarization service 120 to enter a network location of the document data 150, or to upload the document data 150.

In step 820, the summarization service 120 can process the document data 150 into reformatted documents 151 that include question-answer pairs. The data can be stored as reformatted documents 151 in a file (e.g., CSV), data structure (e.g., JSON or tabular), or database (e.g., set of tables, object store), so these terms are used interchangeably in the present disclosure, as can be appreciated.

In step 830, the summarization service 120 can transform the question-answer pairs into declarative sentences. For example, the summarization service 120 can transform the question-answer pairs into declarative sentences as described above with respect to the declarative transformation component 126 and the sentence correction component 128.

In step 840, the summarization service 120 can load a BERT or other base language model into memory. The BERT or other base language model can be stored as an initial model in the model data 159.

In step 850, the summarization service 120 can feed the base language model a set of canonical sentences that result from transforming the question-answer pairs into declarative sentences. Alternatively, the summarization service 120 can feed the base language model any set of canonical sentences from the training data 157. Training can be performed for a duration of time.

In step 860, the summarization service 120 can save a trained model in the model data 159. The trained model can be saved for use to classify a defined set of aspects for a particular domain, field, or topic area as discussed with respect to the aspect classification component 130. Using a model tuned with domain specific documents results in improved classification efficacy.

Figure 9:
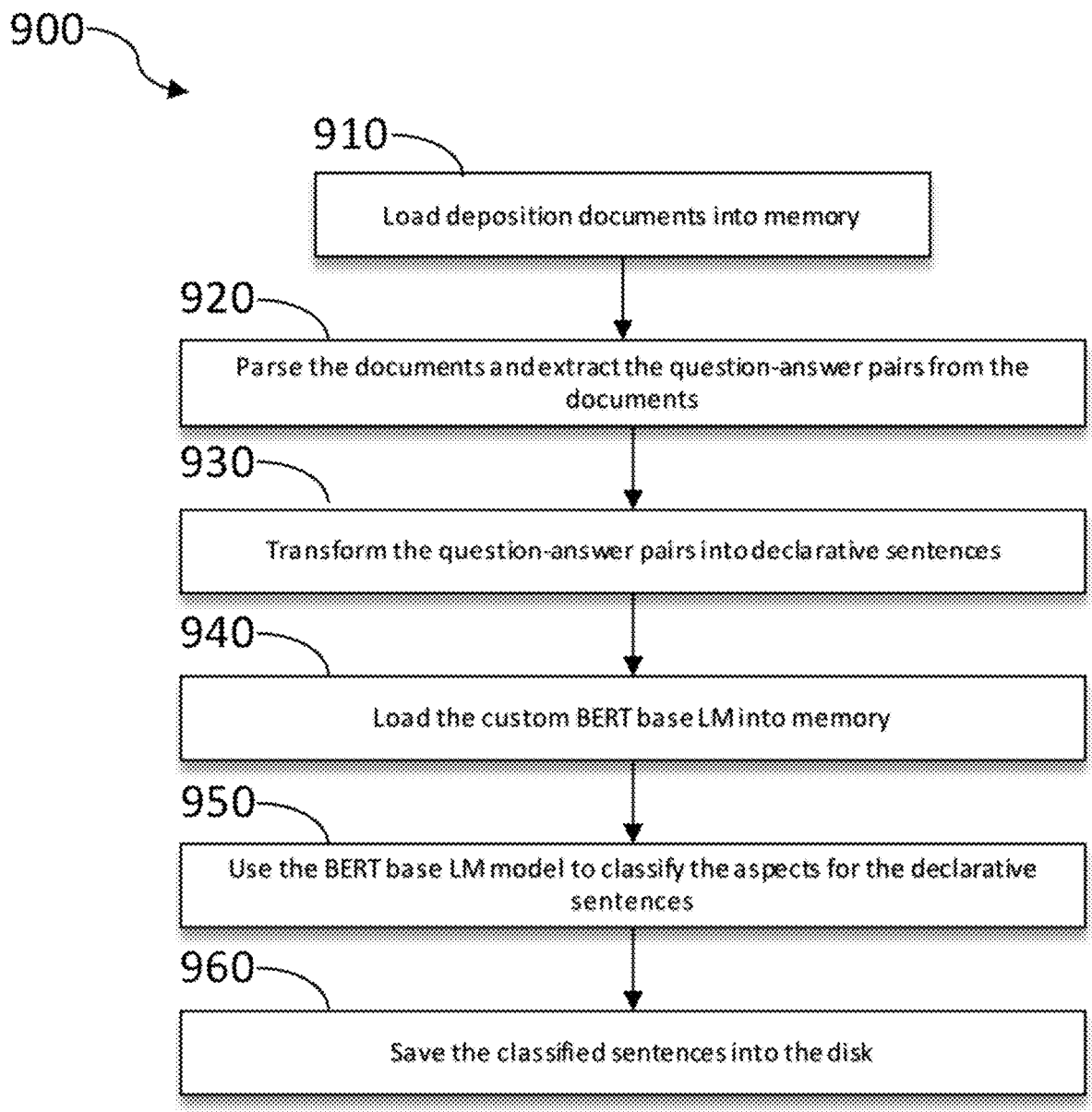
FIG. 9 shows a flowchart that provides one example of the operation of components of the networked environment for aspect classification, according to various embodiments of the present disclosure.

FIG. 9 shows a flowchart 900 that provides one example of the operation of components of the networked environment 100 for aspect classification, according to various embodiments of the present disclosure. While the steps are described as performed by the summarization service 120, certain functionalities can be performed by particular components of the summarization service 120 and other components of the networked environment 100. Steps are provided for example purposes, and can be performed sequentially, concurrently, with partial concurrence, and scrambled relative to the shown order. Improvements to the aspect classification can result from using a trained model, as is explained below. The aspect classification can be custom trained to align to the legal domain.

In step 910, the summarization service 120 can load deposition documents into memory. For example, a client device 109 can provide documents as document data 150, which can be transmitted over a network from the client device 109 to the summarization service 120. In other cases, a user can access a user interface of the summarization service 120 to enter a network location of the document data 150, or to upload the document data 150.

In step 920, the summarization service 120 can process the document data 150 into reformatted documents 151 that include question-answer pairs. The data can be stored as reformatted documents 151 in a file (e.g., CSV), data structure (e.g., JSON or tabular), or database (e.g., set of tables, object store), so these terms are used interchangeably in the present disclosure, as can be appreciated.

In step 930, the summarization service 120 can transform the question-answer pairs into declarative sentences. For example, the summarization service 120 can transform the question-answer pairs into declarative sentences as described above with respect to the declarative transformation component 126 and the sentence correction component 128.

In step 940, the summarization service 120 can load a language model into memory. For example, a BERT base language model, a BERT trained model trained according to the flowchart 800, or another language model can be loaded from the model data 159.

In step 950, the summarization service 120 can use the loaded language model to classify aspects for declarative sentences in the canonical format, as discussed with respect to the aspect classification component 130 above.

In step 960, the summarization service 120 can save the classified sentences to the data store 141. For example, the classification for each declarative sentence can be added to a table or another data structure in association with each of the declarative sentences.

Figure 10:
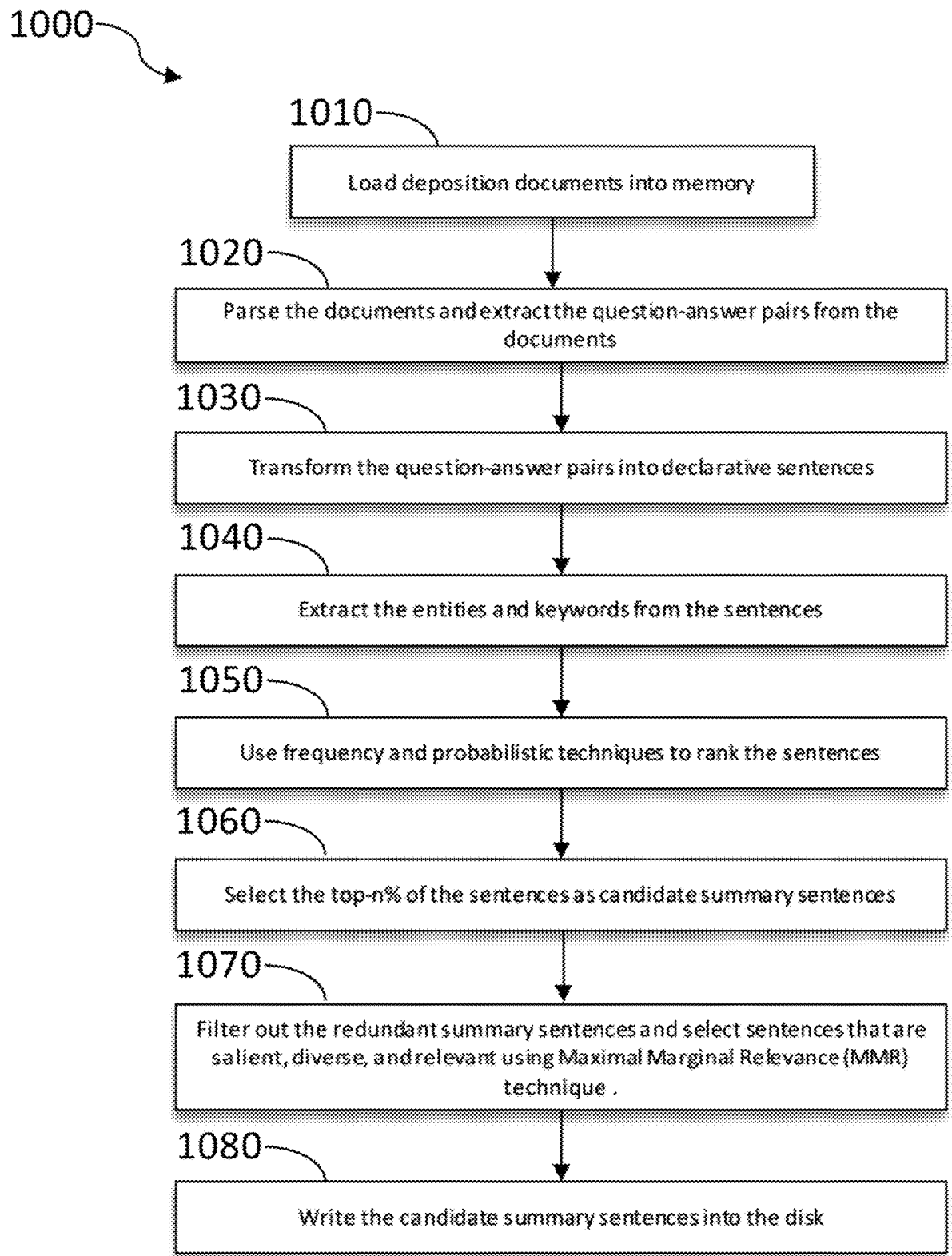
FIG. 10 shows a flowchart that provides one example of the operation of components of the networked environment for candidate summary sentence generation, according to various embodiments of the present disclosure.

FIG. 10 shows a flowchart 1000 that provides one example of the operation of components of the networked environment 100 for summary generation, according to various embodiments of the present disclosure. While the steps are described as performed by the summarization service 120, certain functionalities can be performed by particular components of the summarization service 120 and other components of the networked environment 100. Steps are provided for example purposes, and can be performed sequentially, concurrently, with partial concurrence, and scrambled relative to the shown order. Improvements to the aspect classification can result from using a trained model, as is explained below. The aspect classification can be custom trained to align to the legal domain.

In step 1010, the summarization service 120 can load deposition documents into memory. For example, a client device 109 can provide documents as document data 150, which can be transmitted over a network from the client device 109 to the summarization service 120. In other cases, a user can access a user interface of the summarization service 120 to enter a network location of the document data 150, or to upload the document data 150.

In step 1020, the summarization service 120 can process the document data 150 into reformatted documents 151 that include question-answer pairs. The data can be stored as reformatted documents 151 in a file (e.g., CSV), data structure (e.g., JSON or tabular), or database (e.g., set of tables, object store), so these terms are used interchangeably in the present disclosure, as can be appreciated.

In step 1030, the summarization service 120 can transform the question-answer pairs into declarative sentences. For example, the summarization service 120 can transform the question-answer pairs into declarative sentences as described above with respect to the declarative transformation component 126 and the sentence correction component 128.

In step 1040, the summarization service 120 can process the canonical sentences from step 1030 to identify and extract entities and keywords present in them. The summarization service 120 can identify and extract entities and keywords as discussed with respect to the named entity recognition component 136 and keyword recognition component 138.

In step 1050, the summarization service 120 can use frequency and probabilistic techniques to score and/or rank the sentences further, e.g., based on the prevalence of entities and keywords contained in them.

In step 1060, the summarization service 120 can select the top-n % of sentences from this ranked list as a list of candidate summary sentences. As indicated, frequency and probabilistic techniques can help identify the important keywords/entities from the whole set. The sentences containing these keywords/entities can be ranked accordingly.

In step 1070, the summarization service 120 can select the most relevant sentences using MMR. For example, this can filter out redundant sentences, and select the most salient, diverse, and relevant sentences. MMR is described with further detail above.

In step 1080, the summarization service 120 can generate a summary using the selected candidate summary sentences. The summary can be generated as a file and transmitted to a client device 109. The summary can also be generated for display in a user interface of the summarization service 120, which can be accessed by the client device 109 over a network 115.

Figure 11:
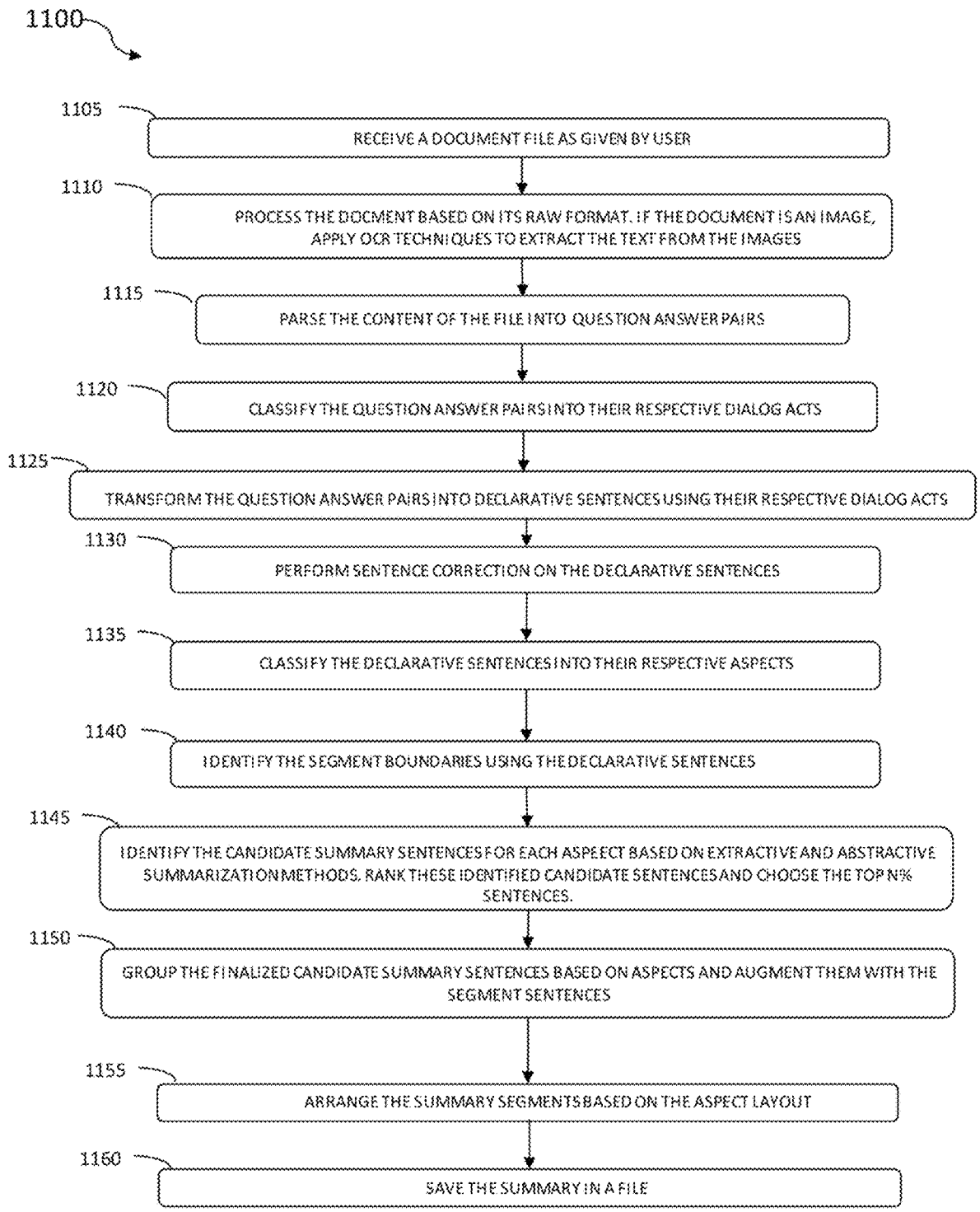
FIG. 11 shows a flowchart that provides one example of the operation of components of the networked environment for summary generation, according to various embodiments of the present disclosure.

FIG. 11 shows a flowchart 1100 that provides one example of the operation of components of the networked environment 100 for summary generation, according to various embodiments of the present disclosure. The overall flowchart 1100 converts the input file, such as in data store 141, into a summary and stores it as summary data 155.

The input document can be received from the user and the content is extracted out of it using various techniques. The content is read into a structured format of question-answer pairs followed by the dialog-act classification for each question and answer. The question-answer pairs are fused together followed by sentence correction to generate a grammatically correct declarative statement. The aspects for the declarative statements are classified. The document is processed to identify the segments that have the same thematic context. The summaries of the sentences for each aspect are generated using extractive and abstractive summarization techniques and a selection of top n % sentences is performed. The summary sentences are augmented with context based on their segments and arranged in a layout based on the aspects. The summary is saved on the disk, such as in data store 141.

In step 1105, the summarization service 120 can receive a question-answer document for processing. For example, a user can log in to a client application 180 or a user interface of the summarization service 120. The user interface can include a user interface element that identifies a question-answer document. The question-answer document can contain one or more documents that include a series of questions and answers. The question-answer document can include text representing a question-answer document, which can include a series of questions and answers. The question-answer document can be in a file (e.g., .pdf, .docx, .rtf, .txt, .ocr, .csv), data structure (e.g., JSON, XML, tabular), or database (e.g., set of tables, object store), and other suitable formats as can be appreciated. In some examples, the question-answer document can be received from a user. In other examples, the question-answer document can be retrieved at runtime from the storage based on a document identifier given by a user.

In step 1110, the summarization service 120 can process the document based on its format. For example, if the document includes an image based format, an appropriate program can be selected to load the image based on its file extension or other attributes. An OCR technique can be applied to extract the text from the image based format.

In step 1115, the summarization service 120 can parse the content of the question-answer document into question-answer groups according to the operation of a portion of the parsing component 122. The raw content of the question-answer document can be loaded into memory and parsed based on its format. Additional processing can be done to translate the raw content into question-answer groups, which can be stored in the intermediate data. The question-answer groups can comprise a data structure file such as a JSON file or an XML file.

The summarization service 120 can also anonymize the content of the question-answer groups according to the operation of a portion of the anonymizing component 123. For example, any piece of personally identifiable information in the question-answer groups can be identified as a non-anonymized token and replaced with its respective anonymized token. The anonymized representation of the question-answer groups can be stored in intermediate data. A mapping from the non-anonymized tokens to the anonymized tokens can also be stored in intermediate data or in mapping data 153. In other cases, no anonymization is performed.

In step 1120, the summarization service 120 can classify the question-answer groups as to dialog act type according to the operation of a portion of the dialog act classification component 124. A classification process can load a classifier with highest classification accuracy from the model data 159 and classify each question and answer according to that classifier. The classified and anonymized representation of the question-answer groups can be stored in intermediate data.

In step 1125, the question-answer groups can be transformed into declarative statements using their respective dialog act classifications according to the operation of a portion of the declarative transformation component 126. Classifying the question-answer groups based on their respective dialog acts can facilitate a case-based handling of the question-answer groups through appropriate transformers, which can be accessed in the model data 159. The declarative statements can be stored in the document data 150 for direct use or downstream processing.

In step 1130, the summarization service 120 can perform sentence correction. Sentence correction can be performed according to the sentence correction component 128. The sentence correction component 128 can perform grammatical error correction based on a BERT language model or another selected language model or approach to Grammatical Error Correction like GECToR. The error correction can further be modified by N-gram based swap, one word deletion, one word replacement, and spell checking. Neural Machine Translation (NMT) based techniques can further correct the generated declarative sentences. Deep Learning based NMT methods focus on learning the context present in a sentence, and converting that into a sentence for a target language. Converting a sentence from a source language to a target language and converting it back into the source language has the ability to remove noise from the sentence. In some cases, sentence correction component 128 can machine translate each original noisy declarative sentence from an original language into "n" languages, and then machine-translate these translated sentences back into the original language. The sentence correction component 128 can use language models from the model data 159 using the back-translated sentences for sequence generation of a final corrected sequence, resulting in a final corrected sentence. For each sentence that needed to be corrected, a noisy source declarative sentence along with corrected sentences that were generated using NMT based translation methods.

In step 1135, the summarization service 120 can classify the declarative sentences into corresponding aspects. Declarative sentences can be classified as discussed with respect to the aspect classification component 130. The aspect classification component 130 can use the deep learning methods described with respect to the dialog act classification component 124. Classifiers based on CNN, LSTM, and BERT can be used as described with respect to the dialog act classification component 124. However, the aspect classification component 130 can identify an aspect or topic for each sentence.

In step 1140, the summarization service 120 can identify segment boundaries using the declarative sentences. The summarization service 120 can identify segment boundaries as discussed regarding the segmentation component 132. Since the segmentation component 132 can use multiple different methods, a selected method, or an ensemble based approach can be used for detecting and defining segment boundaries. The individual segment boundaries from each of the methods can be identified, and the segmentation component 132 can then use a voting scheme to assign a segment boundary. For example, a majority or other vote count of a predetermined threshold vote count (e.g., 2 or greater) can be used to assign a boundary.

In step 1145, the summarization service 120 can identify candidate summary sentences for each aspect based on extractive and abstractive summarization methods. The candidate sentences can be ranked. The top n-% sentences can be selected. The summarization service 120 can identify candidate summary sentences as indicated for the summarizing component 134. The summarizing component 134 can use multiple summarization methods on sentences grouped by aspects to generate or identify candidate summary sentences. These summary candidates can be augmented with sentences from the segment they were a part of. In other cases, the summary candidates are not augmented, for example, in the case of KL-divergence based selection. A voting-based scheme can rank the summary candidates, and the top summary candidates can be used to generate a final summary.

In step 1150, the summarization service 120 can group the finalized candidate summary sentences based on aspects and augment them with the segment sentences. In step 1155, the summarization service 120 can arrange the summary segments based on aspect layout. In step 1160, the summary can be saved in a file or another data structure for display in a website, a web application, a client application 180, or by another application.

The flowchart 1100 can also be described as taking inputs including the document to be summarized, and a configuration to control the method, including specifying options and parameters. The configuration parameters can be entered using a user interface of the summarization service 120, or by editing and providing a configuration file. The output can be a file or user interface that includes a summary of the document.

Sub-algorithm for Document Preparation:
1) Receive the document to be summarized.
2) For each page that is an image of text
   a. Determine if the page has multiple parts.
   b. If Yes
      i. Identify each part, and associate with each part a part identifier.
      ii. Order the parts to generate a suitable sequence of images for the page.
   c. Apply optical character recognition (OCR) to each of a sequence of images, to generate text.
3) Optionally supplement the text content with page and line number information.
4) Parse the content of the file into questions and answers (QAs).
5) If anonymization is desired, anonymize the contents of the question-answer pair text.
6) Classify the question-answer pairs according to their respective dialog acts.
7) Transform the question-answer pair text into declarative statements using their respective dialog acts.
8) If correction is desired, correct the declarative statements, e.g., to improve grammar and clarify meaning.
9) If a summarization method has been identified that yields acceptable results, apply that method to the declarative statements to yield a summary.
10) Classify the declarative statements as to aspect, identifying each type of aspect. This step can be further refined using a classifier with better classification efficacy.
11) Save the prepared document, that has QA pairs, declarative sentences, and aspect IDs for each QA pair.

Sub-algorithm for Document Summarization:
1) Group the sentences according to aspect. For each aspect:
   a. Concatenate all the sentences for the aspect.
   b. For each of a selected set of extractive and/or abstractive summarization methods:
      i. Identify candidate summary sentences.
      ii. Record for each candidate sentence that it was chosen by this method, and optionally save any associated score produced by the method.
   c. For each sentence that was chosen as a candidate, calculate a voting score, e.g., total the number of votes it received (i.e., the number of summarization methods that identified it as a candidate summary sentence).
   d. Arrange the candidate summary sentences according to the voting scores they received.
   e. Select the best of those sentences, e.g., the top-n % of those sentences, or the number of sentences so a compression ratio r is achieved. The parameters n and r are configurable and can be set differently for each aspect.
   f. For each selected sentence, identify the segment that contains it. This segment provides context for the given sentence. Add to the set of selected sentences, those sentences from their segments that augment the set with necessary context.
   g. For each segment that has selected sentences, use a selected extractive and/or abstractive summarization method to generate a summary for that segment.
   h. Concatenate the summaries from all of the segments to generate a summary for the aspect.
2) Use the aspect layout, as defined in the configuration, to determine the placement and the order of the different segment summaries for the different aspects. The result is the generated summary for the document.
3) Save the summary in a file in various formats (see FIG. 13A, 13B, 13C).

Figure 12:
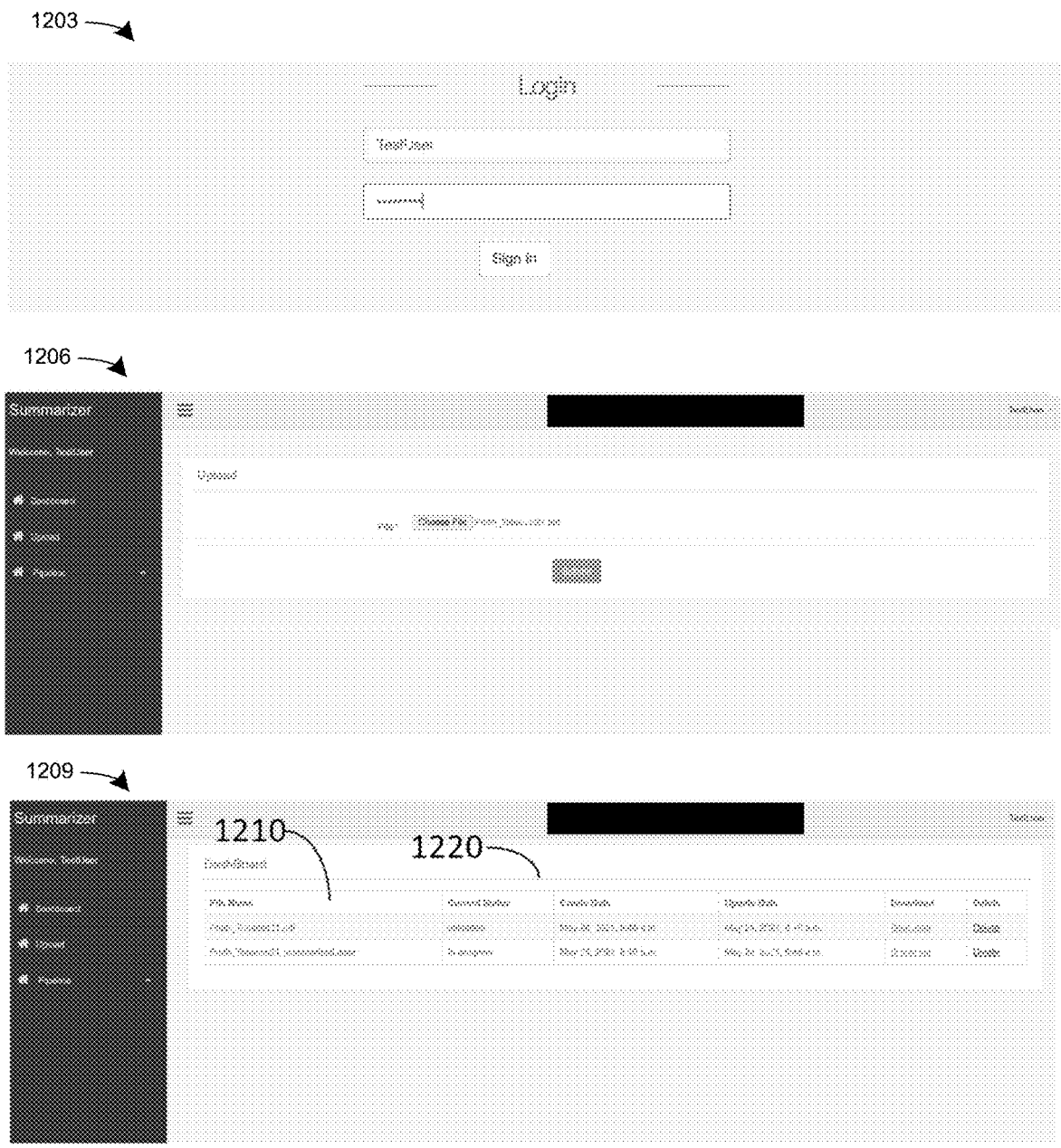
FIG. 12 shows example user interface elements generated by components of the network environment, according to various embodiments of the present disclosure.

FIG. 12 shows example user interfaces 1203, 1206, and 1209 generated by the summarization service 120. The user interface 1203 shows an example where a user is presented a login screen to access the summarization service 120. The user entered credentials are verified against an authentication backend store.

The user interface 1206 shows an example that can be presented to the user when they want to start a new summarization task. The user can select a file from their local computing device and upload it to the system.

The user interface 1209 shows an example screen with the various documents 1210 that relate to the summarization. The first row shows the uploaded file while the second row indicates that a summary file is being generated. The documents can be in various stages 1220 of processing. Using the Download button in the second to last column, the user can download the original input file as well as the generated summary file. Alternatively, the user can choose to view the file through the interface.

FIG. 13A shows an example screen 1300 that shows a generated page and line number summary of the source document. The extracted metadata 1310 of the document is shown at the top of the summary document. The page number column 1320 represents the page number of the source document, while the line number column 1330 represents the line number. The content of the extractive summary for each selected portion of the document (identified by a page and line number span given in columns 1320 and 1330), is shown in the summary column 1340.

Figure 13B:
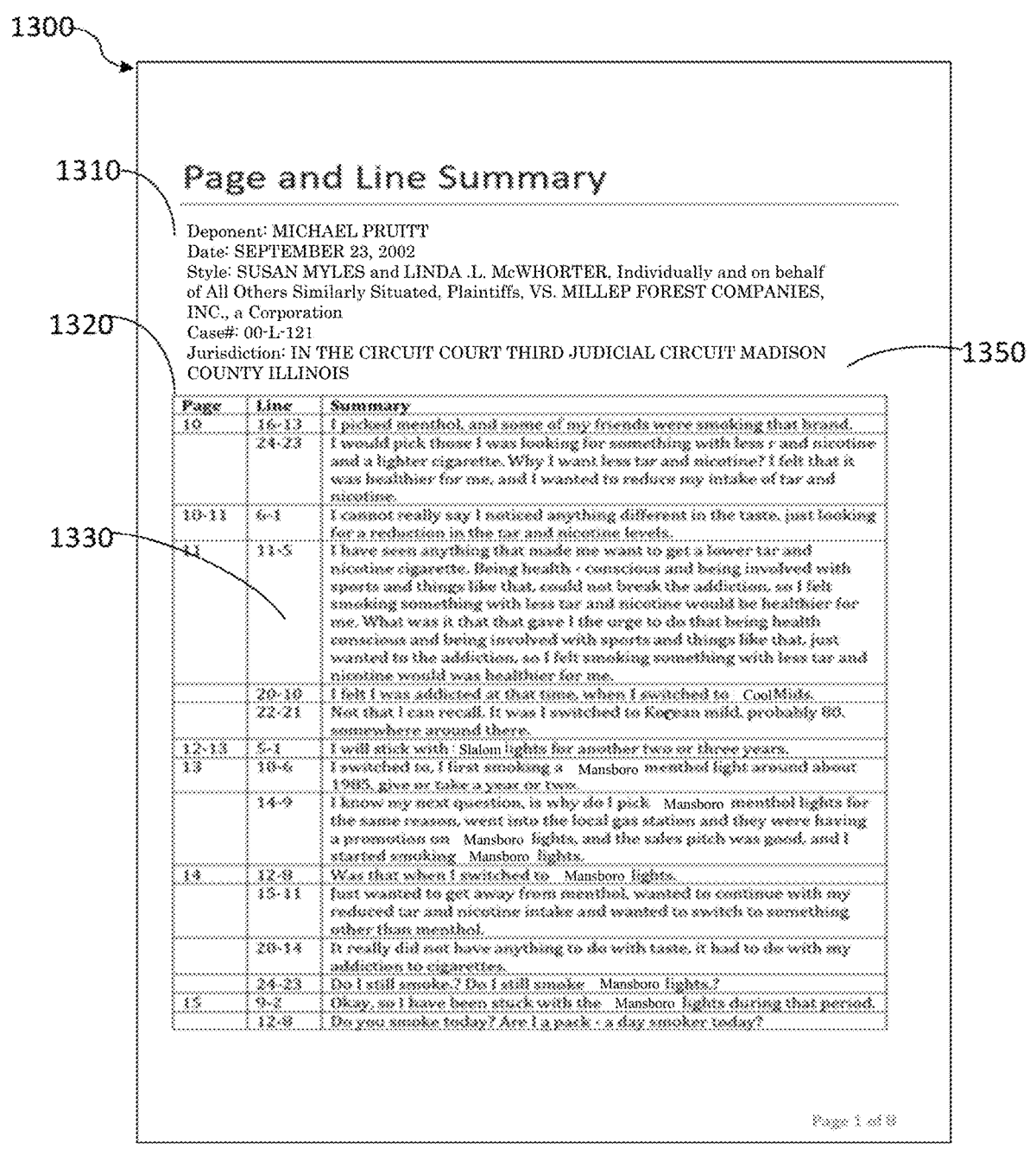

FIG. 13B shows an example screen similar to FIG. 13A, but the summary column 1350 shows the (corrected) declarative sentences that correspond to the selected portion of the document (identified by a page and line number span given in columns 1320 and 1330).

FIG. 13C shows an example screen similar to FIG. 13A, but there is a column each for showing question-answer pairs 1360 and declarative sentences 1370.

FIG. 14 shows a table 1400 detailing a comparison of the results associated with a custom trained language model and its performance compared to the base model. The first column, 1410, in the figure gives alphabetic identifiers of the test documents for which the classification is being performed. The next three columns, 1420, show the aspect classification results with the base model. The following three columns, 1430, show aspect classification results when the custom trained model is used. The P, R, and F1 column names represent the precision, recall, and F1-score, respectively. For each of them, higher values are better. Since F1-score gives an overall assessment of quality, it can be seen that using the custom trained model can include better performance than the base model, and can be used when training data 157 is available.

Figure 15:
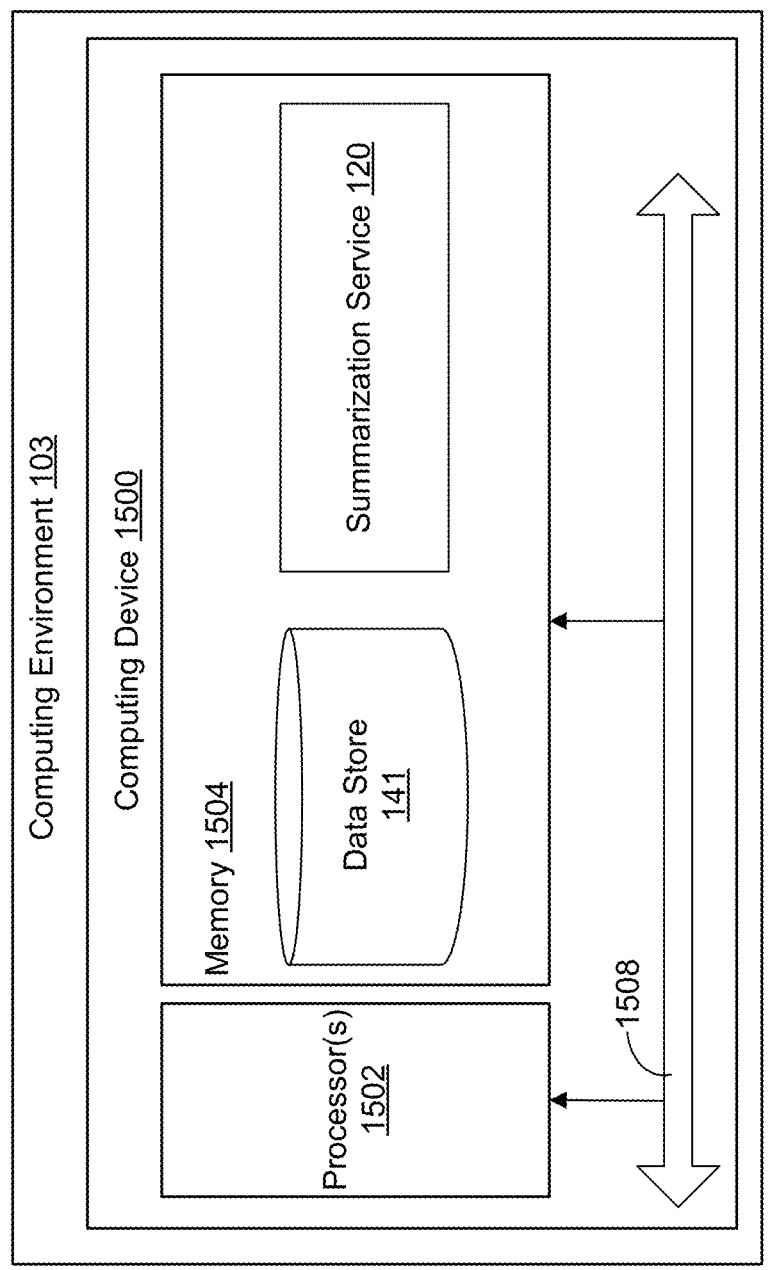
FIG. 15 shows an example of a computing environment with a computing device that can act as a host or server, according to various embodiments of the present disclosure.

FIG. 15 shows a schematic block diagram of the computing environment 103. The computing environment 103 can include one or more computing devices 1500. Each computing device 1500 includes at least one processor circuit, for example, having one or more processors 1502 (which can include one or more CPUs, and one or more GPUs), and one or more memories 1504, all of which can be coupled to a local interface 1508. To this end, each computing device 1500 can comprise, for example, a data bus with an accompanying address/control bus or other bus structure as can be appreciated.

Stored in the memory 1504 are several components that are executable by the processor 1502. In particular, stored in the memory 1504 and executable by the processor 1502 are one or more components of the summarization service 120. In addition, an operating system can be stored in the memory 1504 and executable by the processor 1502. The data store 141 can include a data store of the memory 1504.

It is noted that the memory 1504 can store other executable-code components for execution by the processor 1502. For example, an operating system can be stored in the memory 1504 for execution by the processor 1502. Where any component discussed herein is implemented in the form of software, any one of a number of programming languages can be employed such as, for example, C, C++, C#, Objective C, JAVA®, JAVASCRPT®, Perl, PHP, VISUAL BASIC®, PYTHON®, RUBY, FLASH®, GO, or other programming languages.

As discussed above, in various embodiments, the memory 1504 stores software for execution by the processor 1502. In this respect, the terms "executable" or "for execution" refer to software forms that can ultimately be run or executed by the processor 1502, whether in source, object, machine, or other form. Examples of executable programs include, for example, a compiled program that can be translated into a machine code format and loaded into a random access portion of the memory 1504 and executed by the processor 1502, source code that can be expressed in an object code format and loaded into a random access portion of the memory 1504 and executed by the processor 1502, or source code that can be interpreted by another executable program to generate instructions in a random access portion of the memory 1504 and executed by the processor 1502, etc.

An executable program can be stored in any portion or component of the memory 1504 including, for example, a random-access memory (RAM), read-only memory (ROM), magnetic or other hard disk drive, solid-state, semiconductor, universal serial bus (USB) flash drive, memory card, optical disc (e.g., compact disc (CD) or digital versatile disc (DVD)), floppy disk, magnetic tape, or other types of memory devices.

In various embodiments, the memory 1504 can include both volatile and nonvolatile memory and data storage components. Volatile components are those that do not retain data values upon loss of power. Nonvolatile components are those that retain data upon a loss of power. Thus, the memory 1504 can include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM can include, for example, a static random-access memory (SRAM), dynamic random-access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device.

The processor 1502 can be embodied as one or more processors 1502 and the memory 1504 can be embodied as one or more memories 1504 that operate in parallel, respectively, or in combination. Thus, the local interface 1508 facilitates communication between any two of the multiple processors 1502, between any processor 1502 and any of the memories 1504, or between any two of the memories 1504, etc. The local interface 1508 can include additional systems designed to coordinate this communication, including, for example, a load balancer that performs load balancing. It is noted that the client device 109 can also include a computing device as described above with a processor and memory that stores the data store and executable instructions including an operating system and applications including the client application 180.

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

As used herein, the term "dialog act" or "dialog act" can represent a communicative intention behind a speaker's utterance in a conversation.

As used herein, the term "aspect" can represent a topic that is contained in a sentence.

As used herein, the term "context" can represent a circumstance or situation that provides information so that a text can be fully comprehended without the need of any other information.

As used herein, the term "segment" can represent a series of sentences that have the same thematic context.

As used herein, the term "chunking" can mean a process of extracting segments, or chunks, from a sentence based on certain rules relating to particular parts-of-speech.

As used herein, the term "chinking" can mean a process of defining what is not to be included in a chunk.

As used herein, the term "wh-question" can mean a question starting with a word like "who," "what," "when," "where," "why," or "how."

As used herein, the term "wh-declarative question" can mean a question starting with a word like "who," "what," "when," "where," "why," or "how", that can include more than one statement.

As used herein, the term "binary question" can mean a question that can be answered affirmatively or negatively.

As used herein, the term "binary-declarative question" can mean a question that can be answered affirmatively or negatively, and can be used for verification of an answer when the answer is in fact known.

As used herein, the term "open question" can mean a question that is general and not specific to a context.

As used herein, the term "choice question" can include a question that can offer a choice among several options as an answer.

As used herein, the term "numerical question" can mean a question that can be specific to a numeric quantity.

As used herein, the term "human-specific question" can mean a question that can be specific to one or more human beings or information concerning one or more human beings.

As used herein, the term "location question" can mean a question that can be specific to one or more locations.

As used herein, the term "entity question" can mean a question that can be specific to one or more other entities.

As used herein, the term "descriptive question" can mean a question that can be answered with a description or characterization of a person, place, thing, or event, as can be appreciated.

As used herein, the term "yes answer" can mean an affirmative answer to a question.

As used herein, the term "yes-declarative answer" can mean an affirmative answer to a question, that includes an explanation for the answer.

As used herein, the term "yes-followup answer" can mean an affirmative answer to a question, that includes another question relating to the question asked.

As used herein, the term "no answer" can mean a negative answer to a question.

As used herein, the term "no-declarative answer" can mean a negative answer to a question that includes an explanation for the answer.

As used herein, the term "no-followup" can mean a negative answer to a question that includes another question relating to the question asked.

As used herein, the term "non-opinion answer" can mean an answer that includes statements that are not opinion and can be informative.

As used herein, the term "opinion answer" can mean an answer that includes statements that are opinion rather than factual.

As used herein, the term "acknowledgement answer" can mean an answer that acknowledges a question or statement.

As used herein, the term "unknown answer" can mean an answer that is given when an answer to the question asked is unknown.

As used herein, the term "confrontational answer" can mean an answer that does not include information and is confrontational in tone, and non-responsive to the question asked.

As used herein, the term "token" can mean an instance of a plurality of characters in some particular text that are grouped together as a useful semantic unit for processing.

As used herein, the term "tokenization" can mean a part of the processing of text that includes chopping or otherwise separating a given sentence or unit of text into tokens or pieces so that certain characters can be removed.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

While the term "remove" and similar terms are used herein, it can be appreciated that the term "remove" and its various forms can also mean separate, extract, and other similar terms as can be appreciated.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

We claim:

1. A method for summarizing a set of question-answer groups,
the method comprising:
parsing, by at least one computing device, a set of question-answer groups to identify a plurality of questions and a plurality of answers, wherein a respective question-answer group comprises a question and at least one answer;
classifying, by the at least one computing device, the set of question-answer groups according to a plurality of dialog acts, wherein a respective dialog act is stored in a data structure in association with a respective one of the question-answer groups;
transforming, by the at least one computing device, the set of question-answer groups into declarative sentences, wherein a respective one of the declarative sentences is stored in a data structure in association with the respective one of the question-answer groups;
performing, by the at least one computing device, sentence correction to modify at least one of the declarative sentences, wherein the sentence correction comprises inputting the at least one of the declarative sentences into a Neural Machine Translation (NMT)

based process that translates the at least one of the declarative sentences into at least one language and back-translates the respective declarative sentence back into an original language to remove noise;

classifying, by the at least one computing device, the set of question-answer groups according to a predetermined set of aspects, wherein a respective aspect is stored in the data structure in association with the respective one of the question-answer groups;

identifying, by the at least one computing device, segment boundaries for the set of question-answer groups based at least in part on the declarative sentences;

identifying, by the at least one computing device, candidate summary sentences from the declarative sentences; and generating, by the at least one computing device, a summary based on a file comprising at least one of the candidate summary sentences arranged according to an aspect layout.

2. The method of claim 1, wherein identifying candidate summary sentences is based at least in part on extractive or abstractive summarization approaches.

3. The method of claim 1, further comprising:
grouping, by the at least one computing device, candidate summary sentences based at least in part on the at least one aspect stored in association with the respective one of the question-answer groups.

4. The method of claim 3, wherein grouping identified candidate summary sentences is based at least in part on aspects of the identified candidate summary sentences.

5. The method of claim 1, further comprising:
ranking, by the at least one computing device, the candidate summary sentences; and
selecting, by the at least one computing device, a predefined portion of the highest ranked ones of the candidate summary sentences.

6. The method of claim 5, wherein ranking the candidate summary sentences further comprises selecting a predefined percentage of the candidate summary sentences based at least in part on a specified compression ratio.

7. The method of claim 5, wherein ranking the candidate summary sentences is based at least in part on a voting scheme.

8. A system for summarizing a set of question-answer groups, the system comprising:
a memory device to store computer-readable instructions thereon; and
at least one computing device configured through execution of the computer-readable instructions to:
parse a set of question-answer groups to identify a plurality of questions and a plurality of answers, wherein a respective question-answer group comprises a question and at least one answer;
classify the set of question-answer groups according to a plurality of dialog acts, wherein a respective dialog act is stored in a data structure in association with a respective one of the question-answer groups;
transform the set of question-answer groups into declarative sentences, wherein a respective declarative sentence is stored in a data structure in association with a respective question-answer group;
perform sentence correction to modify at least one of the declarative sentences, wherein the sentence correction comprises a Neural Machine Translation (NMT) based process that translates the respective declarative sentence into at least one language and back-translates the respective declarative sentence back into an original language to remove noise;

classify the plurality of question-answer groups according to a predetermined set of aspects, wherein a respective aspect indicator is stored in the data structure in association with the respective question-answer group;

identify a plurality of segments for the set of question-answer groups based at least in part on the declarative sentences, wherein at least one segment boundary indicator is stored in the data structure in association with at least one question-answer group;

identify candidate summary sentences from the declarative sentences; and generate a file or user interface comprising a summary that is based on at least one of the candidate summary sentences arranged according to an aspect layout.

9. The system of claim 8, wherein identification of the candidate summary sentences is based at least in part on extractive or abstractive summarization approaches.

10. The system of claim 8, wherein grouping identified candidate summary sentences is based at least in part on aspects of the candidate summary sentences.

11. The system of claim 8, wherein the computer-readable instructions further cause the computing device to augment the candidate summary sentences based at least in part on a corresponding segment of the plurality of segments, wherein the candidate summary sentences are augmented using at least one of: a word, a title, a label, a phrase, and a sentence.

12. The system of claim 8, wherein the sentence correction comprises n-gram based swap, a one-word deletion, and one word replacement.

13. The system of claim 8, wherein the sentence correction comprises calculation of a corrected sentence score for a corrected sentence based on intrinsic language modeling properties for the respective declarative sentence.

14. The system of claim 13, wherein the sentence correction comprises a comparison of the corrected sentence score to an original sentence score, wherein the respective declarative sentence is modified in response to the corrected sentence score being identified as better than the original sentence score.

15. A non-transitory computer-readable medium embodying at least one program that, when executed by at least one computing device, directs the at least one computing device to:
parse a set of question-answer groups to identify a plurality of questions and a plurality of answers, wherein a respective question-answer group comprises a question and at least one answer;
classify the set of question-answer groups according to a plurality of dialog acts, wherein a respective dialog act is stored in a data structure in association with a respective one of the question-answer groups;
transform the set of question-answer groups into declarative sentences, wherein a respective declarative sentence is stored in a data structure in association with the respective question-answer group;
perform sentence correction on at least one of the declarative sentences, wherein the sentence correction comprises a Neural Machine Translation (NMT) based process that translates the respective declarative sentence into at least one language and back-translates the respective declarative sentence back into an original language to remove noise;

classify the set of question-answer groups according to a predetermined set of aspects, wherein a respective aspect indicator is stored in the data structure in association with the respective question-answer group;

identify segment boundaries corresponding to a plurality of segments for the set of question-answer groups based at least in part on the declarative sentences, wherein at least one segment boundary indicator is stored in the data structure in association with at least one question-answer group;

identify candidate summary sentences from the declarative sentences; and generate a file or user interface comprising a summary that is based on a selected at least one of the candidate summary sentences arranged according to an aspect layout.

16. The non-transitory computer-readable medium of claim 15, wherein the sentence correction comprises calculation of a corrected sentence score for a corrected sentence.

17. The non-transitory computer-readable medium of claim 16, wherein a respective question or a plurality of questions of the set of question-answer groups is classified as one of a plurality of question dialog act categories.

18. The non-transitory computer-readable medium of claim 16, wherein the sentence correction comprises calculation of a corrected sentence score for a corrected sentence based on intrinsic language modeling properties for the respective declarative sentence.

19. The non-transitory computer-readable medium of claim 15, wherein the selected at least one of the candidate summary sentences is selected by processing the candidate summary sentences using a Maximal Marginal Relevance (MMR) process.

20. The non-transitory computer-readable medium of claim 15, wherein the at least one program, when executed by the at least one computing device, directs the at least one computing device to:

calculate, for a respective one of the candidate summary sentences, a voting score corresponding to a total the number of summarization methods that identified the respective one of the candidate summary sentences.

* * * * *